United States Patent
Benson et al.

(10) Patent No.: US 8,455,137 B2
(45) Date of Patent: Jun. 4, 2013

(54) APPARATUS AND METHOD FOR FRACTURE ABSORPTION LAYER

(75) Inventors: Martin H. Benson, Littleton, CO (US); Bernd J. Neudecker, Littleton, CO (US)

(73) Assignee: ITN Energy Systems, Inc., Littleton, CO (US)

( * ) Notice: Subject to any disclaimer, the term of this patent is extended or adjusted under 35 U.S.C. 154(b) by 3410 days.

(21) Appl. No.: 10/840,497

(22) Filed: May 6, 2004

(65) Prior Publication Data

US 2004/0219434 A1    Nov. 4, 2004

Related U.S. Application Data

(62) Division of application No. 10/210,180, filed on Aug. 2, 2002, now Pat. No. 6,770,176.

(51) Int. Cl.
*H01M 6/04*    (2006.01)
*H01M 6/18*    (2006.01)

(52) U.S. Cl.
USPC ............................................. 429/188; 429/304

(58) Field of Classification Search
None
See application file for complete search history.

(56) References Cited

U.S. PATENT DOCUMENTS

| | | | |
|---|---|---|---|
| 4,837,230 A | 6/1989 | Chen et al. | |
| 4,980,202 A | 12/1990 | Brennan et al. | |
| 5,268,216 A | 12/1993 | Keem et al. | |
| 5,314,765 A | 5/1994 | Bates | |
| 5,338,625 A | 8/1994 | Bates et al. | |
| 5,445,903 A | 8/1995 | Cable et al. | |
| 5,445,906 A | 8/1995 | Hobson et al. | |
| 5,455,106 A | 10/1995 | Steffier | |
| 5,480,707 A | 1/1996 | Steffier | |
| 5,494,762 A * | 2/1996 | Isoyama et al. | 429/221 |
| 5,512,147 A | 4/1996 | Bates et al. | |
| 5,538,814 A * | 7/1996 | Kamauchi et al. | 429/303 |
| 5,542,163 A * | 8/1996 | Chang | 29/2 |
| 5,545,435 A | 8/1996 | Steffier | |
| 5,558,907 A | 9/1996 | Steffier | |
| 5,561,007 A * | 10/1996 | Saidi | 429/224 |
| 5,567,210 A * | 10/1996 | Bates et al. | 29/623.5 |
| 5,569,520 A * | 10/1996 | Bates | 429/162 |
| 5,682,594 A | 10/1997 | Kennedy et al. | |
| 5,948,196 A | 9/1999 | Huang | |

(Continued)

FOREIGN PATENT DOCUMENTS

| | | |
|---|---|---|
| GB | 2 236 540 A | 4/1991 |
| KR | 9612317 B1 | 9/1996 |

(Continued)

OTHER PUBLICATIONS

U.S. Appl. No. 10/210,180; Issue Fee Payment; Jun. 16, 2004; 3 pagest.

(Continued)

*Primary Examiner* — Barbara Gilliam
*Assistant Examiner* — Adam A Arciero
(74) *Attorney, Agent, or Firm* — Lathrop & Gage LLP

(57) ABSTRACT

An apparatus for use as a fracture absorption layer, and an apparatus for use as an electrochemical device are taught. The apparatuses of the present invention may be of particular use in the manufacture of thin-film, lightweight, flexible or conformable, electrochemical devices such as batteries, and arrays of such devices. The present invention may provide many advantages including stunting fractures in a first electrochemical layer from propagating in a second electrochemical layer.

29 Claims, 13 Drawing Sheets

Present Invention :

U.S. PATENT DOCUMENTS

| | | |
|---|---|---|
| 6,168,884 B1 | 1/2001 | Neudecker et al. |
| 6,218,049 B1 | 4/2001 | Bates et al. |
| 6,224,968 B1 | 5/2001 | Van Den Berg et al. |
| 6,413,675 B1 * | 7/2002 | Harada et al. .............. 429/300 |
| 6,770,176 B2 | 8/2004 | Benson et al. |
| 2001/0016273 A1 | 8/2001 | Narasimhan et al. |
| 2002/0071992 A1 | 6/2002 | Fauteux et al. |
| 2003/0059526 A1 | 3/2003 | Benson |
| 2003/0064292 A1 | 4/2003 | Neudecker et al. |
| 2003/0068559 A1 | 4/2003 | Armstrong et al. |
| 2004/0048157 A1 | 3/2004 | Neudecker |
| 2005/0271796 A1 | 12/2005 | Neudecker et al. |

FOREIGN PATENT DOCUMENTS

| | | |
|---|---|---|
| WO | WO 97/21538 | 6/1997 |
| WO | WO 98/47196 | 10/1998 |
| WO | WO 99/43034 | 8/1999 |
| WO | WO 00/08234 | 2/2000 |
| WO | WO 03/022564 | 3/2003 |
| WO | WO 03/023880 | 3/2003 |

OTHER PUBLICATIONS

Related U.S. Appl. No. 10/210,180, Examiner's Interview Summary dated Nov. 24, 2003.

Related U.S. Appl. No. 10/210,180, Notice of Allowability dated Apr. 19, 2004.

Related U.S. Appl. No. 10/210,180, Office Action mailed Dec. 22, 2003.

Related U.S. Appl. No. 10/210,180, Response to Office Action of Dec. 22, 2003, filed Mar. 22, 2004.

* cited by examiner

Present Invention :

APPARATUS AND METHOD FOR FRACTURE ABSORPTION LAYER

RELATED APPLICATIONS

This application is a divisional application of commonly owned U.S. patent application Ser. No. 10/210,180, filed 2 Aug. 2002 now U.S. Pat. No. 6,770,176.

This invention may have been made with Government support under Contract No. MDA972-02-C-0021 awarded by DARPA. The Government may have certain rights in this invention.

BACKGROUND OF THE INVENTION

1. Field of the Invention

The present invention relates to and includes an apparatus for use as a fracture absorption layer, an apparatus for use as an electrochemical device, and methods of manufacturing the same. The apparatuses and methods of the present invention may be of particular use in the manufacture of thin-film, lightweight, flexible or conformable, electrochemical devices such as batteries, and arrays of such devices. The present invention may provide many advantages including stunting fractures in a first electrochemical layer from propagating in a second electrochemical layer.

2. Description of the Art

During electrochemical charging of electrochemical devices, such as, for example, lithium-free and lithium-ion, solid-state, thin-film, secondary battery configurations, the lithium anode may be formed as an entirely new layer (as in a lithium-free configuration) or the lithium anode may expand up to 400% of its original, as fabricated thickness (as in the lithium-ion configuration). The electrochemical device may contain a metallic lithium anode which may be configured wither with an initially lithium-accepting cathode, such as $V_2O_5$, or an initially lithium-donating cathode, such as $LiCoO_2$. In the former case, the metallic lithium anode will contract significantly during the initial electrochemical step (discharge) whereas in the latter case the metallic lithium anode will expand significantly during the initial electrochemical step (charge). These volume changes may create stress points and planes that may be managed only with difficulty, prior to the present invention. These volume changes, which may be referred to herein as "breathing," may reverse during each battery half-cycle. Consequently, a single-layer thin-film electrolyte (for example, lithium phosphorus oxynitride (Lipon)) may, unfortunately, be bulk fractured as a net amount of lithium atoms is transferred from the positive cathode to the negative anode (this process may be referred to as "battery charge") and as a net amount of lithium atoms is transferred from the negative anode to the positive cathode (this process may be referred to as "battery discharge").

This problem may be aggravated in the aforementioned, highly stressed lithium-free and lithium-ion battery configurations, but may also occur in lithium batteries (such as those in which a metallic lithium anode is already present in the as-fabricated state). Thus, all lithium-based, solid-state, thin-film, secondary battery configurations (lithium, lithium-free, and lithium-ion) may suffer from the same stress-creating effect, the "breathing" of such batteries during electrochemical cycling.

Fracture of the thin-film electrolyte may occur through its bulk. Such bulk fracturing of this electrolyte, even when it presents a crack width of only several angstroms across, can result in undesirably high battery current leakage. Indeed, high battery current leakage is generally associated with or considered a complete battery failure. As a result, only low operation yields and poor reliability with lithium-free and lithium-ion configurations had been obtained prior to the present invention. The operation yield may be defined as the fraction of batteries (or other electrochemical devices) in a fabrication batch that does not develop an internal current leak during the first step (otherwise known as the activation of the battery), which is a charge for batteries configured with a lithium-donating cathode and is a discharge for batteries configured with a lithium-accepting cathode. This first step is, in each case, the time at which the stress levels are the highest. Although for lithium and lithium ion batteries both cathode types can be used, lithium-free batteries can be configured only with lithium-donating cathodes otherwise electroplating of the metallic lithium anode can not be accomplished.

In contrast, the fabrication yield may be defined as the fraction of non-leaking batteries (or other electrochemical devices) in a fabrication batch prior to the initial step (charge or discharge depending on the nature of the cathode). Previously, the fabrication yields of all lithium-based, solid-state, thin-film, secondary battery configurations (lithium, lithium-free, and lithium-ion) were comparable to each other and approximately 95%. However, only the lithium batteries had a 95% operation yield. The lithium-ion batteries had a maximum operation yield of about 75% and the lithium-free batteries had a maximum operation yield of about 50%. Additionally, many non-leaking lithium-free and lithium-ion thin-film batteries developed leaks during later cycles. Thus, the yield of non-leaking lithium-free and lithium-ion batteries after 1000 cycles was less than 10%.

Presently a need exists to provide this battery technology on thin flexible foils and polymers. Also, lithium-free and lithium-ion configurations (configurations in which there is not a deposited lithium anode) are becoming increasingly valuable as a way of eliminating the difficulties and hazards of processing a metal lithium anode. In particular, there is a need to provide these configurations on flexible substances.

Unfortunately, an integral and critical component of these desired cells, the lithium phosphorus oxynitride (Lipon) electrolyte, is traditionally fabricated as a single-layer, glassy, thin-film ceramic. Consequently, it has been problematic to make batteries that survive conformable strains associated with flexing, bending, or wrapping. These externally induced strains may lead to bulk fractures (fractures that extend through the entire electrolyte layer, either immediately or eventually upon subsequent battery operation in later cycles) of this single layer ceramic electrolyte. As a result the battery may leak electrical current or fail.

Likewise, lithium-free and lithium-ion configurations may experience internal contraction and expansion stresses and strains. These stresses and strains may be associated with the creation of an in-situ electroplated, interposed lithium anode layer between the electrolyte and the metallic anode current collector during cycling of lithium-free batteries. Similarly, the strong expansion and contraction of the lithium-ion anode in lithium-ion batteries may also cause bulk fractures. These internal stresses and strains may produce bulk fractures with the same result as those fractures that are externally induced. These fractures in the traditionally single layer ceramic electrolyte may similarly lead to battery leakage or failure. Thus, both electrical cycling and mechanical deformation may have the same detrimental effect on thin-film batteries fabricated with a single layer of ceramic electrolyte such as Lipon.

Traditionally, rigid ceramic, glass, and silicon planar wafers have been provided as substrates for solid-state thin-film battery fabrication. More recently, a need has arisen to provide solid-state thin-film batteries on flexible substrates such as metal foils and polymer films. Achieving batteries on such substrates, as, for example, addressed by the present invention, may provide the advantages of reducing the substrate thickness and weight, thereby enabling energy storage device incorporation into tighter, conformable, and flexible space configurations.

Attempts at creating certain thin-film batteries have been published. For example, U.S. Pat. Nos. 6,218,049; 5,567,210; 5,445,906; 5,338,625; 6,168,884; and WO 98/47,196 describe methods for fabricating thin-film deposited lithium-based batteries. Similarly, U.S. Pat. No. 5,512,147 describes a thin-film electrolyte, lithium phosphorus oxynitride or Lipon, that can be employed in solid-state thin-film lithium-based batteries.

U.S. Pat. No. 5,314,765 describes a multilayer of electrolyte materials consisting of an organic polymer containing inorganic lithium salt bulk electrolyte adjoining a thin film of the aforementioned Lipon electrolyte material. similarly WO 99/43,034 describes a multilayer of electrolyte materials consisting of a bulk layer of $Li_2S_4$ "catholyte" adjoining a thin film of the aforementioned Lipon electrolyte material. However, unlike the present invention, these inventions utilize Lipon as an additional chemical separator from a lithium anode to an organic polymer electrolyte, rather than to serve in any form of fracture absorbing capacity.

U.S. Pat. Nos. 5,455,106; 5,545,435; and 5,558,907 describe combinations of multi-layer refractory ceramic coatings interposed with very thin fugitive carbon coatings in ceramic composites for the stunting of fractures within this multi-layer interfacial system. U.S. Pat. No. 4,837,230 describes refractory and carbon layers interposed with ceramic matrix layer interfaces as applied to ceramic reinforcement fabric for crack propagation inhibiting and flexural strength increase. WO 97/21,538 and U.S. Pat. No. 5,948,196 disclose a multi-layer ceramic film interface on fibers for crack stunting within the interfacial layers.

An alternative mechanism that has been proposed in the use of thin-film interlayers in composites to eliminate bulk, brittle, composite fracture is the provision of a poorly adhered or chemically debonded, thin-film slip layer for the fiber pullout required in high strength composites. U.S. Pat. No. 4,980,202 describes certain fracture toughness associated with the application of a carbon coating on reinforcing fibers in ceramic composite systems for a sliding interfacial layer which enables the fibers to strain, thereby increasing the strength of and eliminating brittle fracturing of the composite. U.S. Pat. No. 5,682,594 describes a variety of thin-film interlayer compositions for similar application in discontinuous fiber or whisker reinforced composite systems. British Patent No. GB 2,236,540 uses thick boron nitride interlayers for fiber pullout and crack blunting in ceramic composites. These latter patents describe examples of the use of thin films to change interfacial properties. In these instances the desired properties are connected with lubricity or reduced adhesion related to linear shearing during fiber pullout. In contrast, the interfacial properties of the multi-layer electrolyte of the present invention may be adapted to maintain good ionic conductivity with adjoining layers, and therefore good adhesion, in order to facilitate battery function, while eliminating the propagation of fractures.

Multi-layers of thin films may also be applied in a non-analogous art as hard coatings to cutting tools and dies as well as gears and other mechanical parts for extended lifetime of the coated device. Examples of multi-layer systems for wear coatings are as follows: U.S. Pat. No. 5,268,216 discloses the application of layers of $MoS_2$, a dry thin-film lubricant, interposed with very thin metallic layers to alter the growth mechanism of multiple interlayers and provide for containment of cracks within the multi-layer system; Korean Patent KR 9,612,317 describes crack prevention on cutting tools by a multi-layer of metal bonded thin films in conjunction with ceramic wear resistant layers; U.S. patent application Ser. No. 2001/016273 describes many ultra-thin multi-layers of alternating composition ceramic layers for abrasive wear resistance; and WO 00/08,234 discloses a multi-layer composite coating of refractory layers of varied composition as microcrack barriers.

SUMMARY OF THE INVENTION

The present invention solves the problems in the art stated above and as provided generally by reference to the present invention in the passages above, such as the problem of bulk fracturing in electrochemical devices. The present invention solves this bulk fracturing problem by, for example, interposing an ion-conducting interlayer between a pair of electrolyte layers. This pair of electrolyte layers sandwiching an interlayer may substitute for a single electrolyte layer.

One type of electrochemical device that may benefit from the present invention is a solid-state thin-film lithium-based secondary battery. Solid-state thin-film lithium-based secondary batteries have been developed and fabricated over the past decade. This technology has involved the construction of batteries on rigid and planar substrates. Other substrates may potentially become available, as taught, for example, in U.S. patent application Ser. Nos. 10/109,991; 60/318,321(expired); and 60/318,319 (expired), which are herein incorporated in their entireties by reference. Lithium anode, lithium-free, and lithium-ion configurations are among the possible choices for materials, with the predominant construction containing a deposited lithium anode.

Solid-state thin-film secondary battery research and manufacturing technology techniques may be employed to produce lithium-based thin-film batteries. Possible configurations include lithium, lithium-ion, and lithium-free battery configurations. This kind of battery may be suitable for such applications as implantable medical devices, smart cards, RFID tags, and other portable electronic devices requiring energy storage.

One object of the present invention is to provide a reconfigured battery electrolyte that may replace a single electrolyte layer, such as glassy Lipon, prone to bulk fracture, with a multi-layer configuration that may include one or more interlayers of lithium-ion conducting materials interposed between multiple electrolyte layers, such as glassy Lipon or glassy $LiAlF_4$ layers, to prevent bulk electrolyte fracture. This technique of multi-layer fracture absorbing electrolyte systems may enable high yields of robust lithium-free and lithium-ion batteries, due to the fracture propagation stunning capability of the electrolyte system of the present invention.

The present invention of a multi-layer, for example, electrolyte system for fracture absorption may enhance survivability and reliability in the manufacturing of solid-state, thin-film secondary batteries in planar and flexible substrate formats. In particular, the present invention may benefit processes that rely on continuous web manufacturing of flexible substrate thin-film battery formats, processes that consequently may require the ceramic components within the battery to withstand the strains of flexible movement. This may include such battery configurations as lithium, lithium-free, and lithium-ion battery types. Flexing, wrapping, or twisting a flexible format thin-film battery may deform deposited ceramic materials within the battery including the electrode and electrolyte layers.

The fracture absorption capability of the present invention, through the technique of a multi-layer electrolyte, may allow for the desired flexibility. If one or more layers of the thin-film battery electrolyte fracture during deformation, the propagation of the fractures is stunted within each interlayer of the electrolyte. This characteristic may enable the continued function of the solid-state, thin film secondary battery without battery current leakage or failure. Application of this fracture absorbing electrolyte system may also improve battery reliability during deformations. Deformations may include, for example, flexing polymeric, ceramic, and metallic fiber batteries, in addition to flexing the planar polymer and metal foil battery format.

It is an object of the present invention to provide a reconfigured battery; its single electrolyte layer, such as glassy Lipon, replaced, for example, by a multi-layer configuration including one or more interlayers of lithium-ion conducting materials interposed between multiple electrolyte layers (for example, Lipon). This may provide the advantage of containing, limiting, or minimizing fractures through only a portion of the electrolyte system, enabling continued battery function.

A technique of nano-engineered, fracture absorbing, multi-layer electrolyte systems has been demonstrated to enable high operation yields of robust lithium-free and lithium-ion batteries. These advantages may accrue from the fracture propagation stunting capability of this electrolyte system. Additionally, it has been demonstrated that application of this fracture absorbing electrolyte system may also further battery survivability and reliability during mechanical deformation such as flexing, wrapping, twisting, and load straining of polymeric, ceramic, and metallic batteries. Planar polymer and metal foil batteries may similarly benefit.

The multi-layer electrolyte system taught by the present invention may be an enabling technology for the industry and may provide a significant thrust in the direction of manufacturing quantities of lithium-based, solid-state, thin-film secondary batteries on flexible, fibrous and planar substrates.

The present invention has been described in terms of lithium-based, solid-state, thin-film, secondary batteries with lithium-free and lithium-ion configurations using glassy Lipon. However, the invention may also be applied to other electrochemical devices such as, for example, similar batteries configured with a metallic lithium anode, other glassy thin-film electrolytes such as $LiAlF_4$, other crystalline thin-film electrolytes, batteries with a thin-film electrolyte and thick-film electrodes.

It is understood that both the foregoing general description and the following detailed description are exemplary and explanatory only and are not restrictive of the invention as claimed. The invention is described, for example, in terms of a lithium based battery configuration, however, one skilled in the art will recognize that other formats may be substituted using the same method and apparatus. Indeed, any electrochemical device, and in particular thin-film electrochemical device, may benefit from the fracture stunting characteristics of the present invention. The accompanying drawings illustrating an embodiment of the invention and together with the description serve to explain the principles of the invention.

DETAILED DESCRIPTION OF THE PREFERRED EMBODIMENTS

Figure 1:
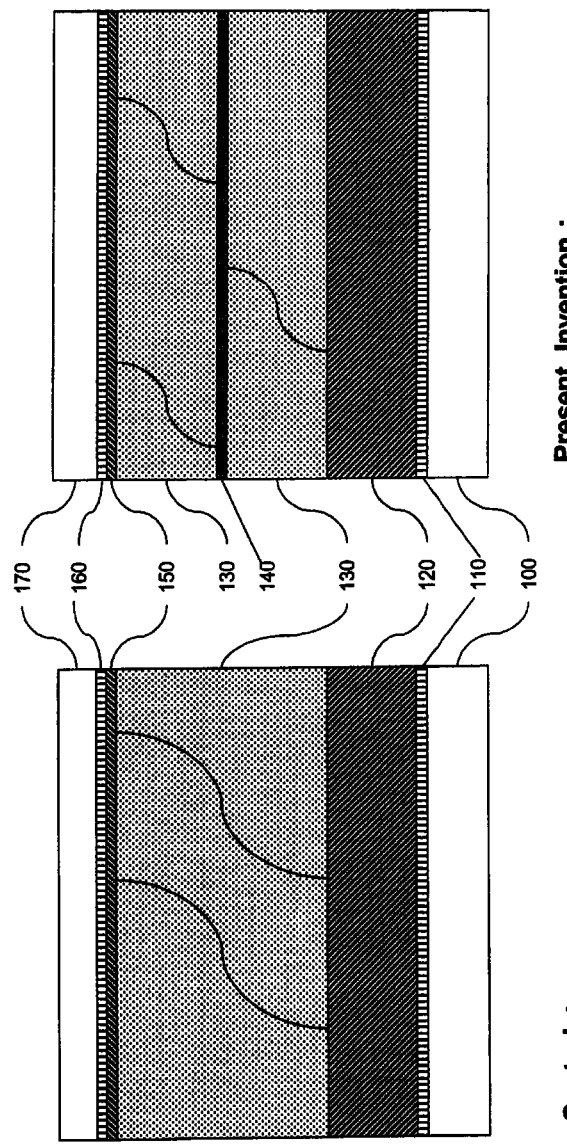
FIG. 1 is a side-view cutaway diagram illustrating a construction of an embodiment of a three layer electrolyte system for fracture stunting, as exemplified in a lithium-free battery.

It is to be understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "a layer" is a reference to one or more layers and includes equivalents thereof known to those skilled in the art. Stunt, as used herein, conveys, for example, its ordinary meaning of "to limit the growth of." For example, the mechanically dissimilar interlayer (although it may also crack) may assist in preventing cracks that start from one side of the electrolyte multilayer from spreading all the way through the multi-layer system, as they would be prone to do if it were just a single layer of electrolyte. Similarly, cracks that start in the interlayer may tend to be confined therein. Thus, the interlayer stunts the growth of fractures.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. All references cited herein are incorporated by reference herein in their entirety.

An object of the present invention is to provide, for example, a novel multilayer electrolyte system for solid-state, thin-film, lithium-based (including, for example, lithium, lithium-ion, and lithium free configurations) secondary battery fabrication. This may be accomplished by reconfiguring a traditional electrolyte from a traditional single amorphous electrolyte layer, such as Lipon, to a multi-layer configuration including one or more interlayers of lithium-ion conducting materials interposed between two or more amorphous electrolyte layers, such as Lipon. Such a multi-layer electrolyte system may prevent leakage and failure of thin-film batteries, in contrast to other electrolyte configurations, in which bulk electrolyte fracture is commonplace. The present invention solves the problem of bulk electrolyte failure that hinders manufacturing of thin-film lithiumfree, inverted lithium-free, lithium-ion, and inverted lithium-ion battery types. Additionally, the present invention may improve reliability of lithium batteries.

An interlayer may be provided with mechanical properties that differ from those of the surrounding layers. However, the interlayer, differing mechanically from the surrounding electrolyte layers, may exhibit lithium-ion conducting properties and may thereby extend the electrolytic properties of the surrounding electrolyte layers. These electrolyte layer may, for example, be Lipon. The interlayer may contain a metallic phase, for example lithiated Sn ($Li_xSn$), that may provide even greater mechanical variance from the surrounding electrolyte layers. This may be the result of its different structure, morphology, and stoichiometry. This mechanical variance may greatly aid in the fracture stunting capability of the interlayer. Also, the interlayer may be designed in terms of thickness and composition to provide a minimum of electrolyte resistance contribution to the overall electrolyte multi-layer system.

the interlayer taught in the present invention may include a variety of materials. Generally, the interlayer may be an electrochemical layer that functions as an ionic conductor, an electric insulator, or a mixed conductor (a conductor of both ions and electrons). Some examples of specific materials include a single or multi-phase compound of $Li_aPSn_bO_cN_d$ wherein $0<a<100$, $0<b<100$, $0<c<a/2+5/2$ $+2b-3d/2$, and $0<d<a/3+5/3+4b/3-2c/3$, elemental lithium, alloyed lithium, elemental phosphorus, alloyed phosphorous, elemental tin, or alloyed tin. Other materials may include a single or multi-phase compound of $Li_aPM_bO_cN_d$ wherein $0<a<100$, $0<b<100$, $0<c<a/2 +5/2+b(Valence of M)/2-3d/2$, $0<d<a/3+ 5/3+b(Valence of M)/3-2c/3$, and M is at least one element selected from group 2 through 15 of the periodic table excluding the elements Li, P, and N. Additional materials that may be used include, for example, a single or multi-phase compound of $Li_aPM_bO_cN_dX_e$ wherein $0<a<100$, $0<b<100$, $0<c<a/2+5/2+b(Valence of M)/2-3d/2-e(Valence of X)/2$, $0<d<a/3+5/3+b(Valence of M)/3-2c/3-e/3(Valence of X)$, $0<e<a/(Valence of X)+5/(Valence of X)+b(Valence of M)/(Valence of X)-2c/(Valence of X)-3d/(Valence of X)$, M is an element selected from group 2 through 15 of the periodic table excluding the elements Li, P, and N, and X is an element selected from S. Se, Te, F, Cl, Br, and I. The following materials may also be suitable for use in the interlayer: $Li_3N$, $Li_2O$, LiF, LiCl, LiBr, LiI, $Li_2Be_2O_3$, $Li_4BeO_3$, Be, BeO, $LiBO_2$, B, $B_2O_3$, BN, $Li_5AlO_4$, $LiAlO_2$, $LiAl_5O_8$, Al, $Al_2O_3$, AlN, $Li_2CO_3$, $Li_4SiO_4$, $Li_8SiO_6$, Si, $SiO_2$, $Si_3N_4$, $Li_4GeO_4$, Ge, $GeO_2$, $Ge_3N_4$, $Li_3PO_4$, P, $P_2O_5$, $P_5N_3$, PN, PON, $P_4ON_6$, $Li_3AsO_4$, As, $As_2O_5$, $Li_2SO_4$, S, $LiClO_4$, $LiScO_2$, Sc, $Sc_2O_3$, $LiYO_2$, Y, $Y_2O_3$, YN, $Li_8ZrO_6$, Zr, $ZrO_2$, ZrN, $LiCeO_2$, Ce, $CeO_2$, $LiAlSiO_4$, $Li_9SiAlO_8$, $Li_{3.6}Si_{0.6}P_{0.4}O_4$, $Li_3Sc_2(PO_4)_3$, $LiTi_2(PO_4)_3$, $Li_{0.2}BPO_{4.1}$, $Li_3BN_2$, $Li_3AlN_2$, $LiSi_2N_3$, $Li_2SiN_2$, $Li_5SiN_3$, $Li_{18}Si_3N_{10}$, $Li_{21}Si_3N_{11}$, $Li_8SiN_4$, $LiPN_2$, $Li_7PN_4$, $LiAlF_4$, $LiAlCl_4$, $LiPF_6$, $LiBF_4$, $Li_3SiS_{3.5}$, $Li_xV_2O_y$ ($0<x=2$; $0<y=5$), $Li_xMn_2O_4$ ($0<x=2$), $Li_xMn_{2-y}O_4$ ($0<x<3$, $0.2<y<0.5$), $Li_xMnO_2$ ($0<x=2.0$), $Li_xCoO_2$ ($0<x=1$), $Li_xNiO_2$ ($0<x=2$), Li, $Li_xSn_3N_y$ ($0<x<100$; $0<y=4.0$), $Li_xInN_y$ ($0<x<100$; $0<y=1.0$), $Li_xZn_3N_y$ ($0<x<100$; $0<y=2.0$), $Li_xZnO_y$ ($0<x<100$; $0<y=1.0$), $Li_xCuN_y$ ($0<x<100$, $0<y=0.33$), $Li_xSiSn_{0.9}ON_{1.9}$("Siton"; $0<x<100$), $Li_xSnO_y$ ($0<x<100$; $0<y=2.0$), $Li_xAl$ ($0<x<100$), $Li_xIn$ ($0<x<100$), $Li_xC_6$ ($0<x<100$), $Li_xSi$ ($0<x<100$), $Li_xSn$ ($0<x<100$), $Li_xP$ ($0<x<100$), or $Li_xZn$ ($0<x<100$). The above materials may be used singly or in compounds, solutions, or mixtures with one another or with other materials.

The interlayer of the present invention may be applied by sputter deposition. The sputter deposition may be performed in an atmosphere of, for example, Ar, $N_2$ and $O_2$. The percentages of each of the constituent gases may range from about 0 to about 100%. The sputter target may include a variety of materials. For example, the sputter target may include $Li_3PO_4$, $Li_4P_2O_7$, $LiPO_3$, $Li_3PO_3$, $Li_2O$, $Li_2O_2$, $Li_3N$, P, $P_2O_5$, $P_5N_3$, PN, PON, $P_4ON_6$, Sn, $Sn_3N_4$, $SnO_2$, $Sn(NO_3)_4$, $Li_xSn$ ($0<x=4.4$), $Li_xP$ ($0<x=3$), $Li_5SnP_3$, $Li_8SnP_4$, $Li_7PN_4$, $Li_{10}PN_{10}$, $LiPN_2$, $LiN_2P$, $Li_{2.88}PO_{3.73}N_{0.14}$, $Li_2SnO_3$, $Li_8SnO_6$, $Sn_4P_3$, SnP, $SnP_3$, $Sn_2P_2O_7$, $Sn_3(PO_4)_2$, or Li. Other materials that may be included in the sputter target include M, $MN_x$ ($0<x<1/3$ valence of M), $MO_x$ ($0<x<½$ valence of M), $M(NO_3)_x$ (x =valence of M), $Li_xM$ (alloy or solid solution of Li and M), or $Li_xP$ ($0 <x =3$), where M is defined above. Additional materials that may be included in the sputter target may include S, sulfur nitride (($SN)_x$), Se, $SeO_x$ (x=2, 2.5, and 3), Te, $TeO_x$ (x=2, 2.5, and 3), LiF, LiCl, LiBr, or LiI. Additional materials that may be included in the sputter target may include $MS_x$ ($0<x<½$ times valence of M), $MSe_x$ ($0<x<½$ times valence of M), $MCl_x$ (x=valence of M), $MBr_x$ (x=valence of M), $MI_x$ (x=valence of M) and $MF_x$ (x=valence of M), $M(SO_4)_x$ (x=½ valence of M), $M(ClO_4)_x$ (x=valence of M), $M(BrO_4)_x$ (x=valence of M), and $M(IO_4)_x$ (x=valence of M), where M is defined above. Other materials that may be included in the sputter target may include $Li_2Be_2O_3$, $Li_4BeO_3$, Be, BeO, $LiBO_2$, B, $B_2O_3$, BN, $Li_5AlO_4$, $LiAlO_2$, $LiAl_5O_8$, Al, $Al_2O_3$, AlN, $Li_2CO_3$, $Li_4SiO_4$, $Li_8SiO_6$, Si, $SiO_2$, $Si_3N_4$, $Li_4GeO_4$, Ge, $GeO_2$, $Ge_3N_4$, $Li_3AsO_4$, As, $As_2O_3$, $As_2O_5$, $Li_2SO_4$, $LiClO_4$, $LiScO_2$, Sc, $Sc_2O_3$, $LiYO_2$, Y, $Y_2O_3$, YN, $Li_8ZrO_6$, Zr, $ZrO_2$, ZrN, $LiCeO_2$, Ce, $CeO_2$, $LiAlSiO_4$, $Li_9SiAlO_8$, $Li_{3.6}Si_{0.6}P_{0.4}O_4$, $Li_3Sc_2(PO_4)_3$, $LiTi_2(PO_4)_3$, $Li_{0.2}BPO_{4.1}$, $Li_3BN_2$, $Li_3AlN_2$, $LiSi_2N_3$, $Li_2SiN_2$, $Li_5SiN_3$, $Li_{18}Si_3N_{10}$, $Li_{21}Si_3N_{11}$, $Li_8SiN_4$, $LiAlF_4$, $LiAlCl_4$, $LiPF_6$, $LiBF_4$, or $Li_3SiS_{3.5}$. Moreover, a sputter target may, for example, include a mixture or compound of the above materials.

The interlayer of the present invention may further be provided with an embedded polymer matrix. Such a polymer matrix may include a material such as polyethelyene oxide, polyimide, polytetrafluoroethylene, polyester, or polyvinylpyrrolidone.

The interlayer of the present invention may be applied by a number of varying techniques. For example, the interlayer of the present invention may be applied using the following techniques: sputter deposition (as, for example, described above), physical vapor deposition, electron beam evaporation, electron-beam directed vapor deposition, thermal evaporation, plasma assisted thermal evaporation, ion plasma plating, cathodic arc plasma deposition, ion beam deposition, plasma assisted ion beam deposition, pulsed laser deposition, chemical vapor deposition, thermal chemical vapor deposition, plasma enhanced chemical vapor deposition, photochemical chemical vapor deposition, molecular beam epitaxy, sol-gel deposition, or spray pyrolysis deposition.

The interlayer of the present may used with a variety of electrochemical devices and substrate types (for example, metallic, polymeric, planar, cylindrical, rigid, flexible, or conformal) as demonstrated, for example, in the descriptions and explanations associated with the figures below.

FIG. 1 provides a pair of diagrams corresponding to an example of a control design contrasted with a design embodying an example of the present invention. In the control example of FIG. 1, a ceramic, metallic, or polymer substrate (100) is first deposited with a metallic cathode current collector (110), such as Au. Next, a second layer consisting of a lithiated cathode electrode material (120), such as $LiCoO_2$, $LiNiO_2$, $Li_2Mn_2O_4$, or $Li_2V_2O_5$, is deposited. The third layer, the electrolyte material (130), such as glassy Lipon, is deposited next. Subsequently, a fourth layer, a metallic anode current collector (160) consisting, for example, of Cu or Cr, is deposited. Finally, an overlayer (170) of, for example, Lipon is applied as a battery encapsulating layer.

During a charge of the control battery, lithium ions plus an equal number of electrons ($Li^+ + e^- = Li$) are transferred from the cathode (120) to the anode current collector (160). While the electrons flow in the external electric circuit, the lithium ions flow inside the battery from the cathode layer electrode (120) through the electrolyte (130) to the anode current collector (160). There, the lithium ions combine with electrons from the external electric circuit which results in electroplating or electro-deposition of a metallic lithium anode (150). Although a fraction of this lithium may be chemically absorbed by the anode current collector (160) as a solid solution, the bulk of the lithium forms a metallic lithium layer (150) between the anode current collector (160) and the electrolyte (130). The transfer of lithium and the formation of the lithium anode layer (150) cause the cathode to change its volume. For example, $LiCoO_2$ expands overall by 2%, whereas $Li_2Mn_2O_4$ contracts overall by 12% during battery charge, due to Li extraction from the positive cathode. Similarly, the transfer of lithium causes the anode to expand, thereby creating stresses. These created stresses lead to bulk electrolyte (130) fracture. Bulk electrolyte (130) fracture may, in turn, result in battery current leakage or failure. During discharge of the battery, the volume changing processes reverse, creating undesirable stress changes. Resultantly, the battery constantly experiences volume changes ("breathing") that result in stress changes during battery cycling. This problem presents a challenge to the use of any solid-state electrolyte material (glassy, amorphous, crystalline, and polymeric).

In the present invention example of FIG. 1, a metallic cathode current collector (110), a lithiated cathode (120), and a Lipon electrolyte (130) may be deposited onto a substrate (100) successively. Subsequently, a thin layer of a lithium-ion conducting material (140), for example, $Li_aP_bSn_cO_dN_e$ ($0<a<100$, $0<b<100$, $0<c<a/2+5/2+2b-3d/2$, and $0<d<a/3+5/3+4b/3-2c/3$), may be deposited on the electrolyte film (130). This layer may be followed by an additional Lipon electrolyte (130) film. The battery configuration may then be completed with the deposition of a metallic anode current collector (160) and an overlayer (170) of, for example, Lipon.

During cycling of a battery using the present invention, lithium transfer may occur under the same mechanism as previously described, however, lithium ions can also move through the interlayer (140). In contrast to the control example, the fractures may not propagate completely through the multi-layer (130, 140, 130) electrolyte system, but rather may propagate within a single electrolyte layer (130) only. This approach may eliminate battery leakage and failure of lithium-free and lithium-ion thin-film batteries due to bulk electrolyte fracture.

Figure 2:
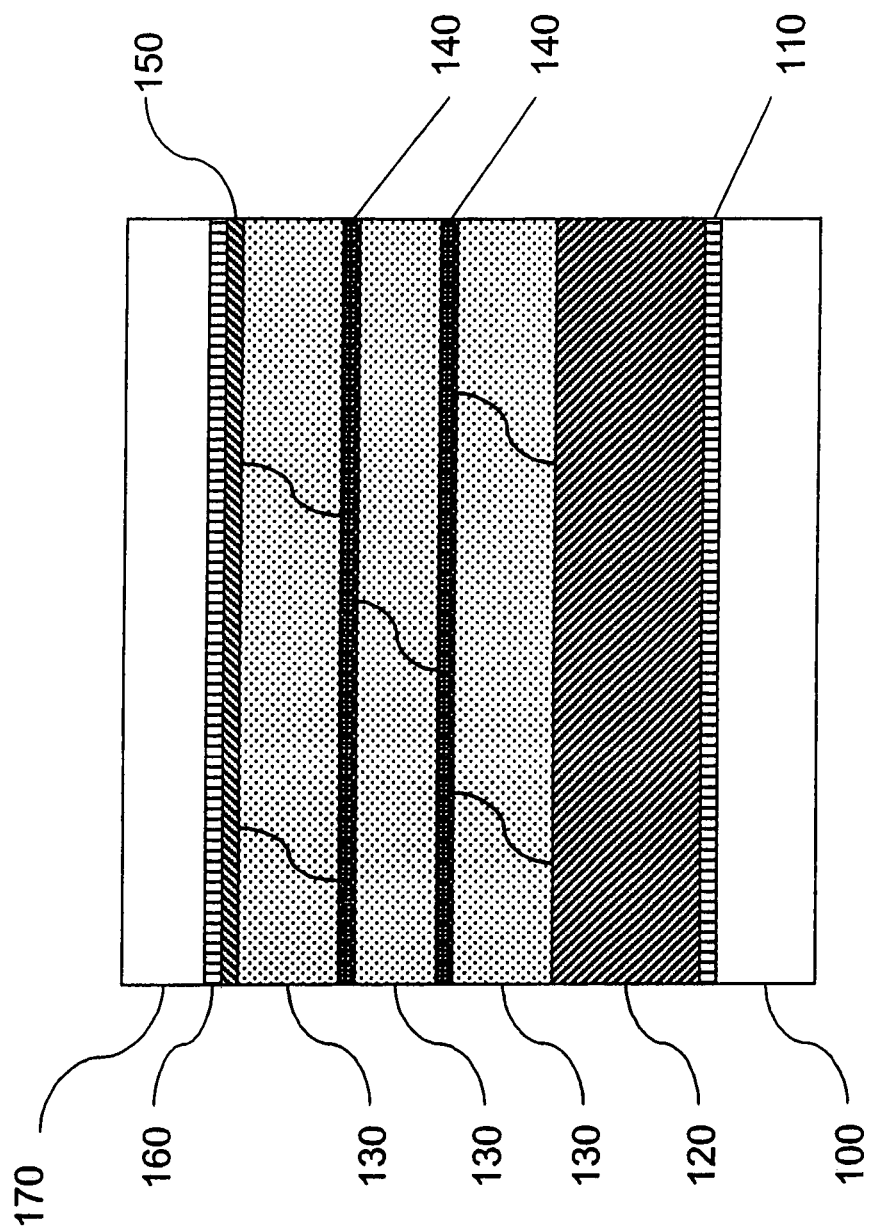
FIG. 2 is a side-view cutaway diagram depicting the stylized function of a five layer electrolyte system embodiment for fracture absorption, as exemplified in a lithium-free thin-film battery.

The multi-layer electrolyte system for fracture absorption is not limited to a single interlayer of, for example, $Li_aP_bSn_cO_dN_e$ ($0<a<100$, $0<b<100$, $0<c<a/2+5/2+2b-3d/2$, and $0<d<a/3+5/3+4b/3-2c/3$) (140) interposed between two Lipon electrolyte (130) layers. FIG. 2 illustrates an embodiment of the present invention employing multiple interlayers.

As shown in FIG. 2, a cathode current collector (110) and a lithiated cathode (120) maybe deposited onto a substrate (100). In this example, two interlayers (140), for example, $Li_aP_bSn_cO_dN_e$ ($0<a<100$, $0<b<100$, $0<c<a/2+5/2+2b-3d/2$, and $0<d<a/3+5/3+4b/3-2c/3$), may be interposed between three layers of, for example, Lipon electrolyte (130). Increasing the numbers of layers within a fracture absorption electrolyte system may result in even greater protection against fracture propagation through the entire system. However, the overall resistance of the electrolyte system should also be considered, and may preferably be minimized. The resistance contribution of each layer to the overall electrolyte system resistance may be a function of the individual layer's lithium ion conductivity and thickness. Thus, tuning variables for the battery's performance may include the composition, stoichiometry, and thickness of each individual layer. Finally, an anode current collector (160) and an overlayer (170) for battery encapsulation may be deposited.

Figure 3:
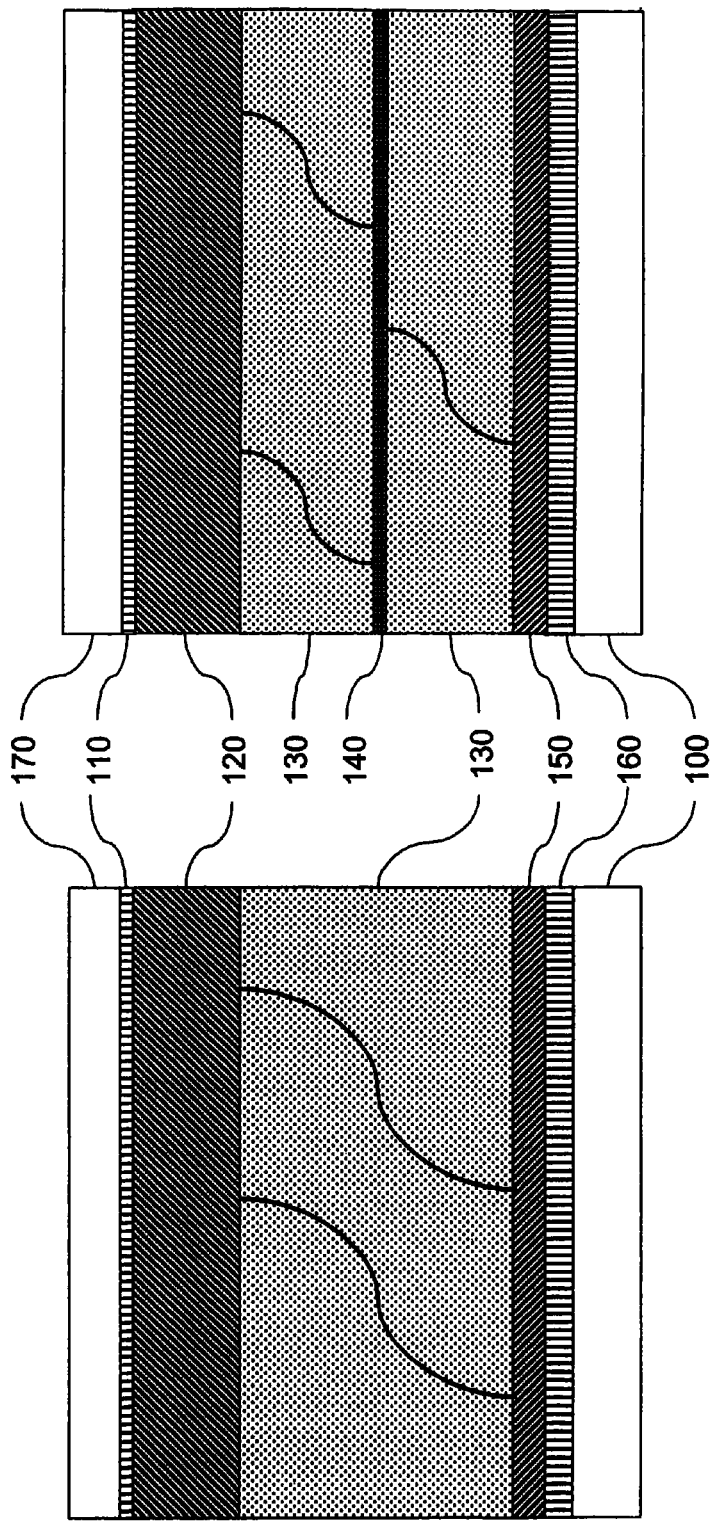
FIG. 3 is a side-view cutaway diagram illustrating a construction of an embodiment of a three layer electrolyte system for fracture stunting, as exemplified in an inverted lithium-free battery.

FIG. 3 illustrates the construction of a three layer electrolyte system for fracture stunting in an inverted lithium-free battery embodiment. In the control example of FIG. 3, a ceramic, metallic, or polymer substrate (100) is first deposited with a metallic anode current collector (160) that does not form intermetallic compounds with lithium. This lithium layer (150) may be in-situ electroplated and the anode current collector (160), such as Cu, may not be needed in the case of a stainless steel substrate. Next, an electrolyte material (130), such as glassy Lipon, may be deposited. Subsequently, a layer of lithiated cathode material (120), such as $LiCoO_2$, $LiNiO_2$, $Li_2Mn_2O_4$, or $Li_2V_2O_5$, may be deposited. Finally, a metallic cathode current collector (110) of, for example, Au, may be deposited prior to applying an optional encapsulating overlayer (170) of, for example, Lipon.

In the present invention example of FIG. 3, the initial construction may remain the same as in the control example: a metallic anode current collector (160) (optional in the case of, for example, a stainless steel substrate), a lithium layer (150), and a Lipon electrolyte (130) may be deposited onto a substrate (100). Subsequently, a thin layer of a lithium-ion conducting material (140), for example, $Li_aP_bSn_cO_dN_e$ ($0<a<100$, $0<b<100$, $0<c<a/2+5/2+2b-3d/2$, and $0<d<a/3+5/3+4b/3-2c/3$) may be deposited on the electrolyte film (130), followed by an additional Lipon electrolyte (130) film. The battery configuration may be completed conventionally with the deposition of a cathode (120), a metallic cathode current collector (110), and an encapsulating overlayer (170) of, for example, Lipon.

Similarly, an inverted lithium-free battery, as described above, may be fabricated with multiple fracture absorbing/stunting interlayers.

Figure 4:
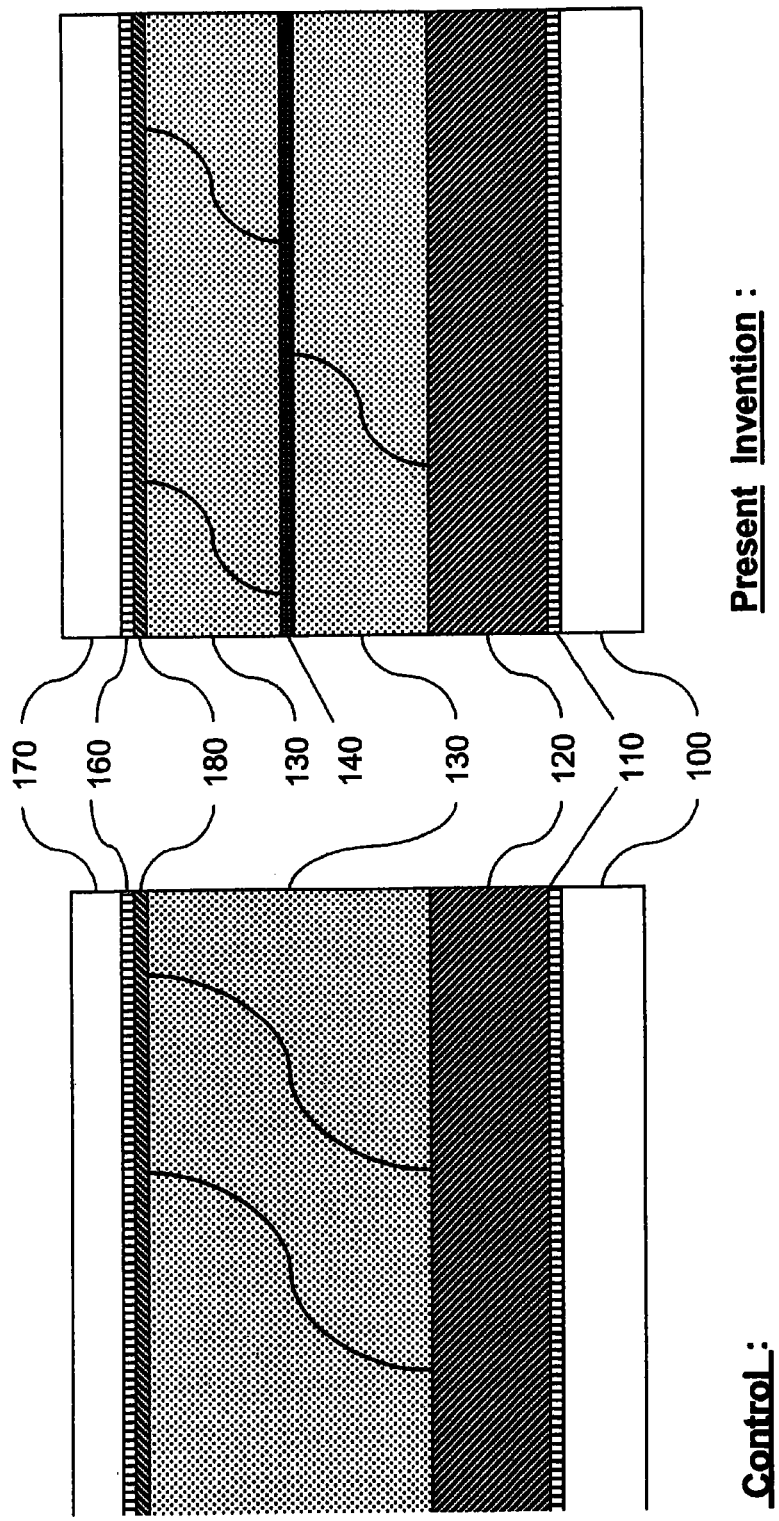
FIG. 4 is a side-view cutaway diagram illustrating a construction of an embodiment of a three layer electrolyte system for fracture stunting, as exemplified in a lithium-ion battery.

FIG. 4 illustrates the construction of a three layer electrolyte system for fracture stunting in a lithium-ion battery. In the control example of FIG. 4, a ceramic, metallic, or polymer substrate (100) may first be deposited with a metallic cathode current collector (110), such as Au, followed by a second layer consisting of a lithiated cathode material (120), such as $LiCoO_2$, $LiNiO_2$, $Li_2Mn_2O_4$, or $Li_2V_2O_5$. The third layer, electrolyte material (130), such as glassy Lipon, may be deposited next. The next layer to be deposited may be the fourth layer, a lithium-ion anode material (180), such as $Sn_3N_4$. This layer may be followed by a metallic anode current collector (160) consisting for example of Cu or Cr. Finally, an overlayer (170) of, for example, Lipon may be applied as a battery encapsulating layer.

During charge of the control battery, lithium ions plus an equal number of electrons are transferred from the cathode (120) to the lithium-ion anode (180). As the electrons flow in the external electric circuit, the lithium ions flow inside the battery from the cathode layer electrode (120) through the electrolyte (130) to the lithium-ion anode (180) where the lithium ions combine with electrons from the external electric circuit. This combination results in the lithiation of the lithium-ion anode (180), and significantly expands its thickness (volume) up to 400% of its as-fabricated volume. This enormous volume change together with the simultaneous volume change of the cathode creates substantial stress in the battery. This stress may lead to bulk electrolyte (130) fracture. Bulk electrolyte (130) fracture may result in battery leakage or failure.

In the present invention example of FIG. 4, the initial construction may include the following process: a metallic cathode current collector (110), a lithiated cathode (120), and a Lipon electrolyte (130) may be deposited onto a substrate (100). Subsequently, a thin layer of a lithium-ion conducting material (140), for example, $Li_aP_bSn_cO_dN_e$ ($0<a<100$, $0<b<100$, $0<c<a/2+5/2+2b-3d/2$, and $0<d<a/3+5/3+4b/3-2c/3$), may be deposited on the electrolyte film (130). Next, an additional Lipon electrolyte (130) film may be deposited. The battery configuration may then be completed with the deposition of a lithium-ion anode (180), a metallic anode current collector (160), and an overlayer (170) of, for example, Lipon as a battery encapsulating layer.

Similarly, a lithium-ion battery, as described above, may be fabricated with multiple fracture absorbing/stunting interlayers.

Figure 5:
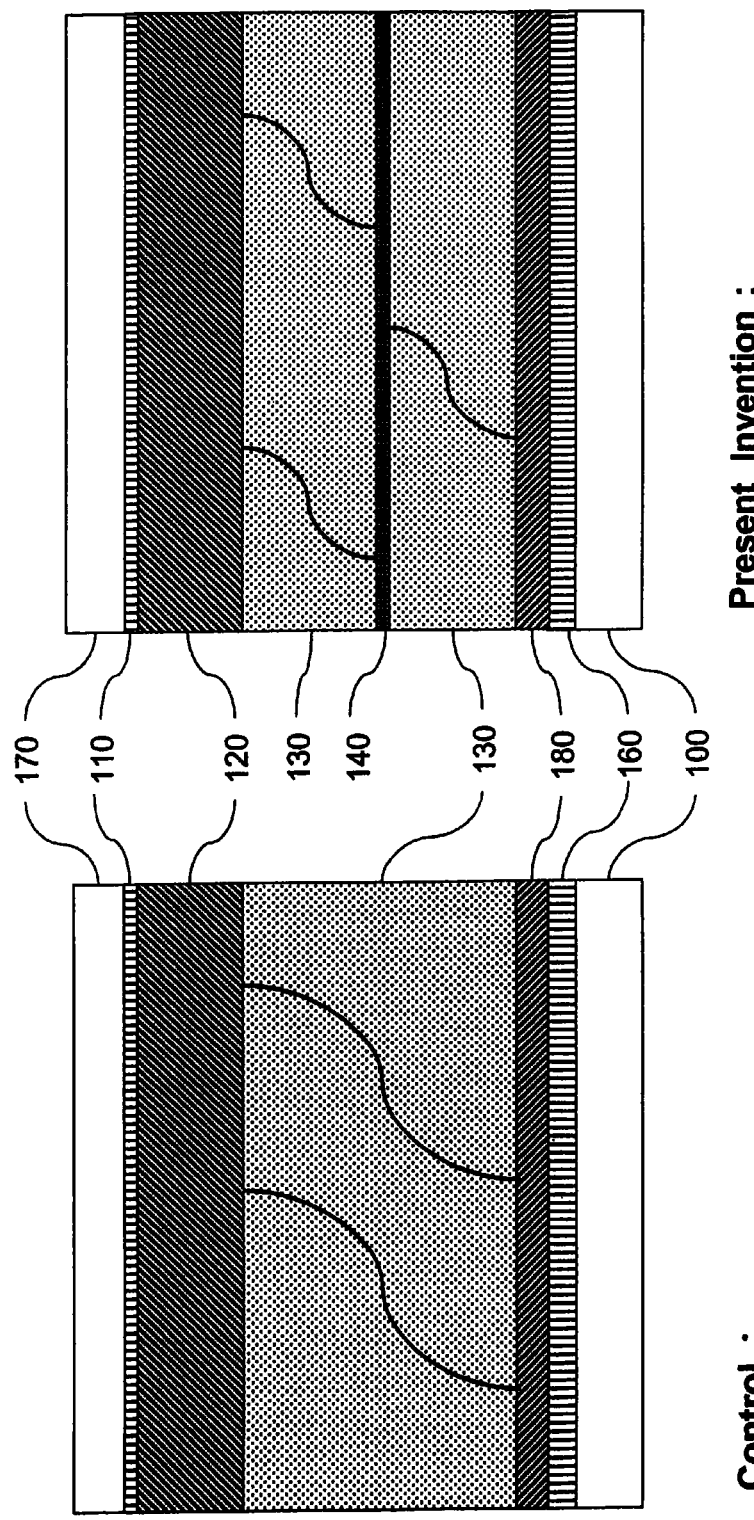
FIG. 5 is a side-view cutaway diagram illustrating a construction of an embodiment of a three layer electrolyte system for fracture stunting, as exemplified in an inverted lithium-ion battery.

FIG. 5 illustrates a construction for a three layer electrolyte system for fracture stunting in an inverted lithium-ion battery. In the control example of FIG. 5, a ceramic, metallic, or polymer substrate (100) may first be deposited with a metallic anode current collector (160), such as Cu, followed by a second layer consisting of a lithium-ion anode (180) material, such as $Sn_3N_4$, and a third layer consisting of electrolyte material (130), such as glassy Lipon. Next, a fourth layer of a lithiated cathode material (120), such as $LiCoO_2$, $LiNiO_2$, $Li_2Mn_2O_4$, or $Li_2V_2O_5$, may be deposited. Finally, the fifth deposited layer may serve as the metallic cathode current collector (110), and may, for example, be Au. This layer may be followed by the deposition of an optional encapsulating overlayer (170) of, for example, Lipon.

In the present invention example of FIG. 5, the initial construction may include the following process: a metallic anode current collector (160), a lithium-ion anode (180), and a Lipon electrolyte (130) may be deposited sequentially onto a substrate (100). Subsequently, a thin layer of a lithium-ion conducting material (140), for example, $Li_aP_bSn_cO_dN_e$ ($0<a<100$, $0<b<100$, $0<c<a/2+5/2+2b-3d/2$, and $0<d<a/3+5/3+4b/3-2c/3$) may be deposited on the electrolyte film (130). This layer may be followed by an additional Lipon electrolyte (130) film. The battery configuration may then be completed with the deposition of a cathode (120), metallic cathode current collector (110), and an encapsulating overlayer (170) of, for example, Lipon.

Similarly, an inverted lithium-ion battery, as described above, may be fabricated with multiple fracture absorbing/stunting interlayers.

Figure 6:
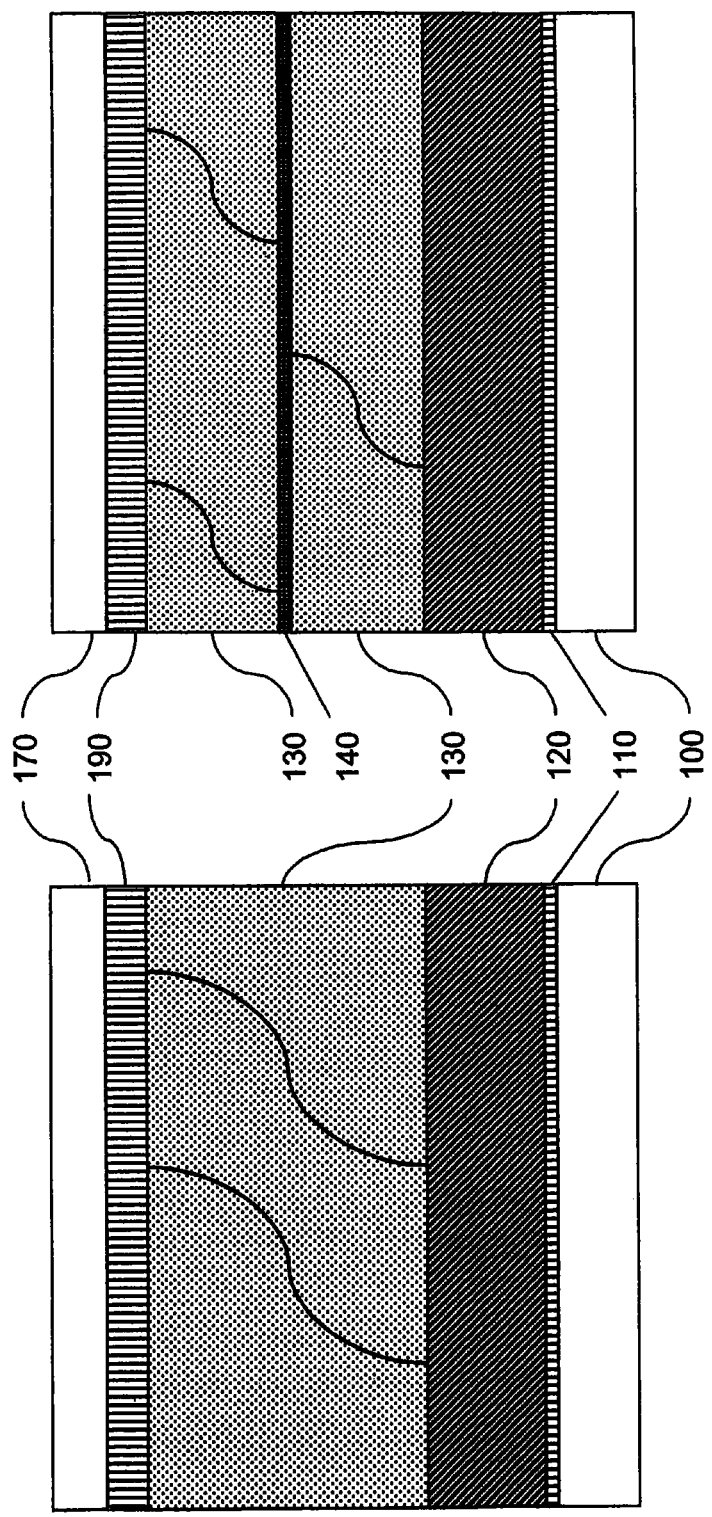
FIG. 6 is a side-view cutaway diagram illustrating a construction of an embodiment of a three layer electrolyte system for fracture stunting, as exemplified in a lithium battery.

FIG. 6 illustrates the construction of a three layer electrolyte system embodiment for fracture stunting in a lithium battery. In the control example of FIG. 6, a ceramic, metallic, or polymer substrate (100) may first be deposited with a metallic cathode current collector (110), such as Au, followed by a second layer of a lithiated or non-lithiated cathode material (120), such as $LiCoO_2$, $LiNiO_2$, $Li_2Mn_2O_4$, $MnO_2$, $Li_2V_2O_5$, or $V_2O_5$. The electrolyte material (130), such as glassy Lipon, may be deposited as a third layer. The fourth layer, a metallic lithium anode (190) may be deposited next. Finally, an encapsulating overlayer (170) of, for example, Lipon may be deposited.

During charge of the battery in the control example, lithium ions plus an equal number of electrons, are transferred from the cathode (120) to the metallic lithium anode (190). As the electrons flow in the external electric circuit, the lithium ions flow inside the battery from the cathode layer electrode (120) through the electrolyte (130) to the lithium anode (190). In the lithium anode (190), the lithium ions combine with electrons from the external electric circuit. This combination results in the electro-deposition of more lithium in the lithium-anode (190) thereby expanding its thickness (volume). This volume increase plus the simultaneous volume change of the cathode creates substantial stress in the battery. This stress may lead to bulk electrolyte (130) fracture. Bulk electrolyte (130) fracture may result in battery current leakage or failure. During discharge of the battery, the volume changing processes reverse, creating undesirable stress. Thus, the battery is constantly experiencing volume changes ("breathing") that result in stress.

In the present invention example of FIG. 6, the initial construction may include the following process: a metallic cathode current collector (110), a lithiated or nonlithiated cathode material (120), and a Lipon electrolyte (130) may be deposited onto a substrate (100). Subsequently, a thin layer of a lithium-ion conducting material (140), for example, $Li_aP_bSn_cO_dN_e$ ($0<a<100$, $0<b<100$, $0<c<a/2+5/2+2b-3d/2$, and $0<d<a/3+5/3+4b/3-2c/3$), may be deposited on the electrolyte film (130). This layer may be followed by an additional Lipon electrolyte (130) film. The battery configuration may be completed with the deposition of a lithium anode (190) and an encapsulating overlayer (170) of, for example, Lipon.

Similarly, a lithium battery, as described above, may be fabricated with multiple fracture absorbing/stunting interlayers.

Figure 7:
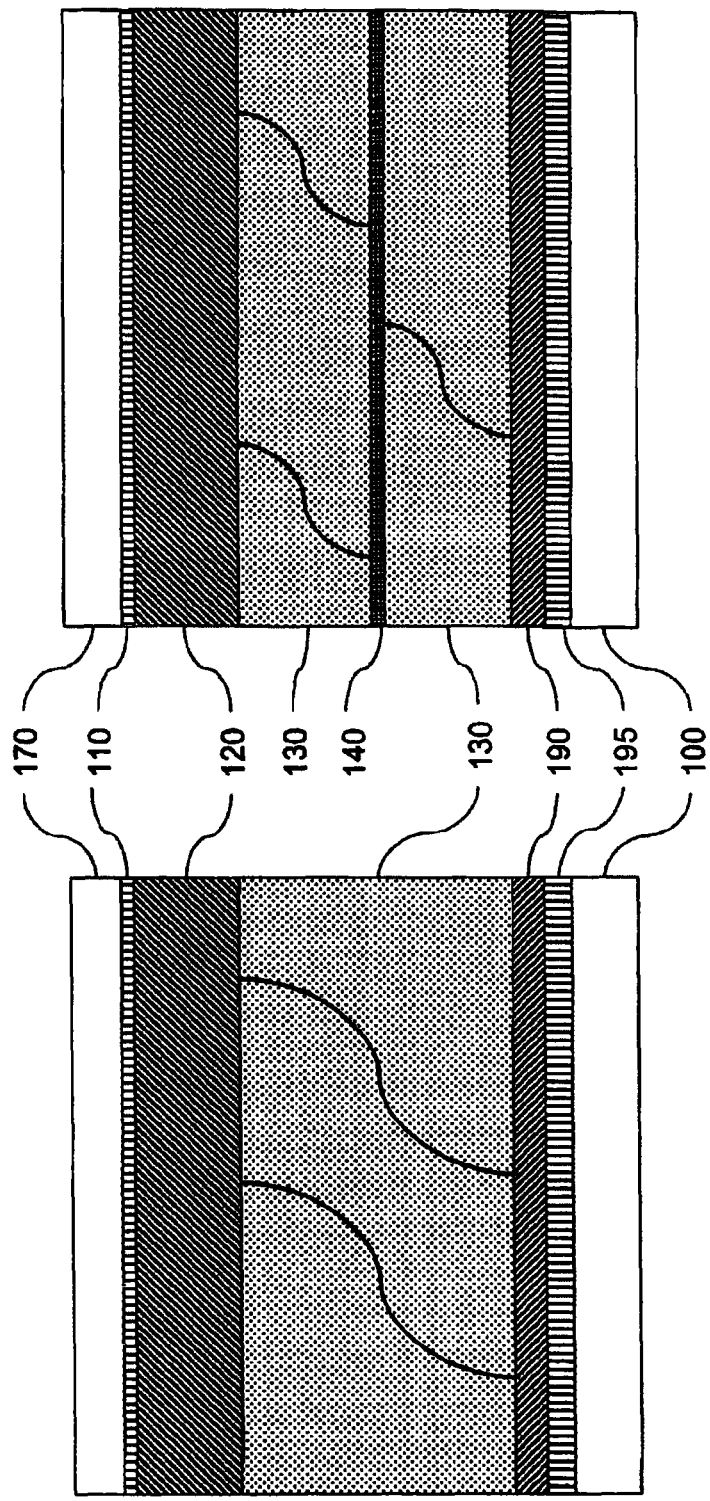
FIG. 7 is a side-view cutaway diagram illustrating a construction of an embodiment of a three layer electrolyte system for fracture stunting, as exemplified in an inverted lithium battery.

FIG. 7 illustrates the construction of an embodiment of a three layer electrolyte system for fracture stunting in an inverted lithium battery. In the control example of FIG. 7, a ceramic, metallic, or polymer substrate (100) may first be deposited with a protective lithium-stable layer (195), such as Lipon. This layer may be followed by the metallic lithium anode (190). The electrolyte material (130), such as glassy Lipon, may be deposited next. Subsequently, the fourth layer of a lithiated or non-lithiated cathode electrode material (120), such as $LiCoO_2$, $LiNiO_2$, $Li_2Mn_2O_4$, $MnO_2$, $Li_2V_2O_5$, or $V_2O_5$, may be deposited. Finally, a metallic cathode current collector (110), such as Au, an encapsulating overlayer (170) of, for example, Lipon may be applied.

In the present invention example of FIG. 7, the initial construction may include the following process: a lithium-stable, protective layer (195) and a Lipon electrolyte (130) may be deposited onto a substrate (100). Subsequently, a thin layer of a lithium-ion conducting material (140), for example, $Li_aP_bSn_cO_dN_e$ (0<a<100, 0<b<100, 0<c<a/2+5/2+2b−3d/2, and 0<d<a3+5/3+4b/3−2c/3), may be deposited on the electrolyte film (130). This layer may be followed by an additional Lipon electrolyte (130) film. The battery configuration may be completed with the deposition of a lithiated or non-lithiated cathode material (120), a cathode current collector (110), and an overlayer (170) of, for example, Lipon as a battery encapsulating layer.

Similarly, an inverted lithium battery, as described above, maybe fabricated with multiple fracture absorbing/stunting interlayers.

The materials that may be used in the interlayer may vary. For example, one material that may be used is $Li_xV_2O_y$ (0<x≦3; 0<y≦5). Another material that may be used is $Li_aP_b$-$Sn_cO_dN_e$ (0<a<100, 0<b<100, 0<c<a/2+5/2+2b−3d/2, and 0<d<a/3 +5/3+4b/3−2c/3).

Figure 8:
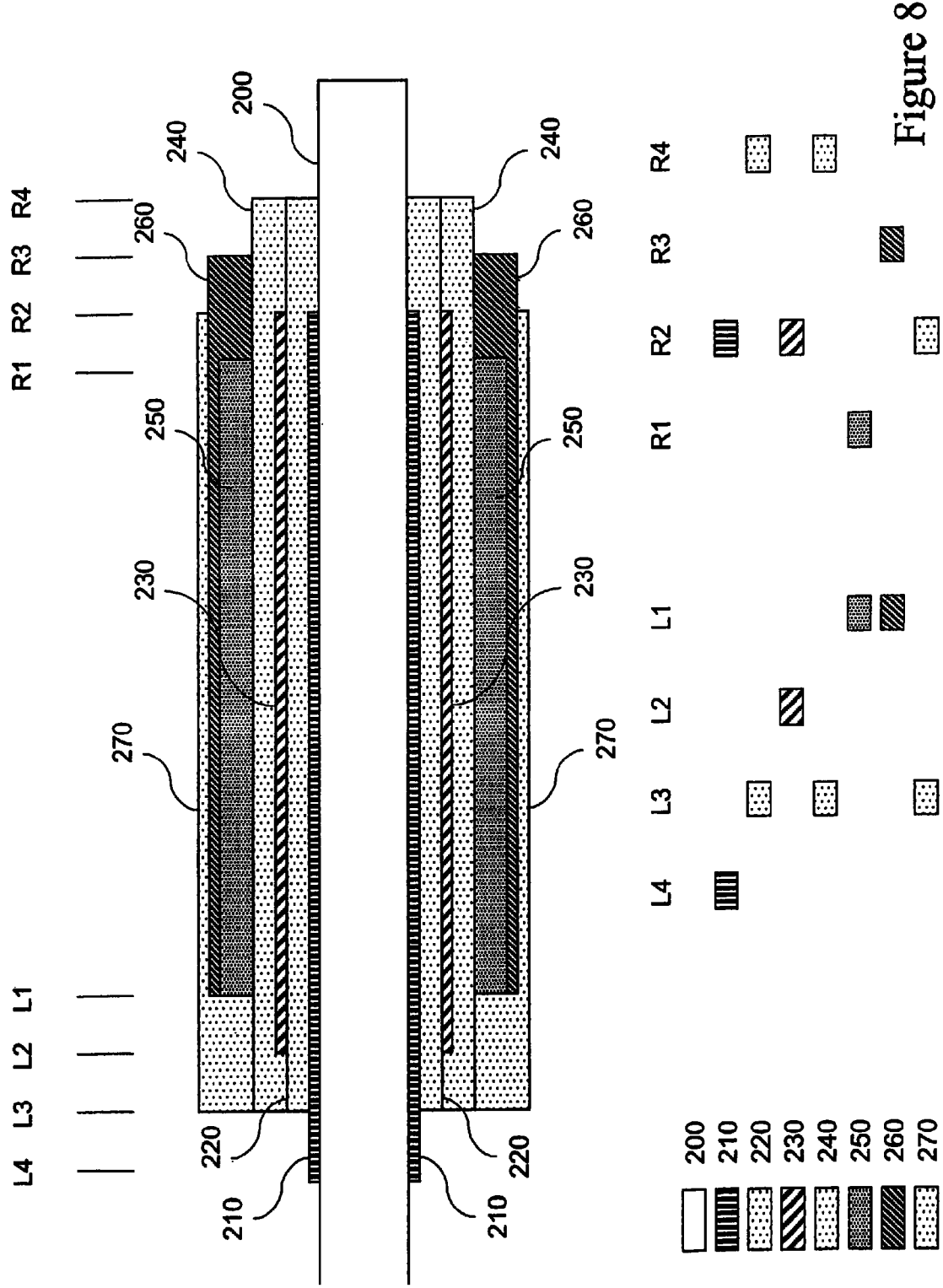
FIG. 8 is a side-view cutaway diagram illustrating an example construction of an embodiment of a three layer electrolyte systems for fracture stunting in thin-film batteries fabricated around fibrous substrate, as exemplified in an inverted lithium-free battery configuration.

FIG. 8 illustrates the construction of a three layer electrolyte system for fracture stunting in thin-film batteries fabricated around fibrous substrates with an inverted lithium-free battery configuration.

The patterning methodology for deposition of solid-state, thin-film secondary batteries on fibrous substrates is described in pending U.S. patent application Ser. No. 10/109, 991, incorporated herein by reference in its entirety. The nomenclature L4-L1 and R1-R4 are specific to the descriptive text associated with this application. Thus, for example, functional patterns may be described in terms of a discretely indexed deposition process. Discrete indexing may not be necessary, but may provide the benefit of consistent results in output. The index used may be an ordinal index, based on a length-wise view of a cross section of a substrate. The index, from left to right along the length of the substrate, may start at L4 and then proceed to L3, then to L2, then to L1. These indexing positions may be followed by R1, then R2, next R3, and finally R4. There is no requirement that there only be eight indexed positions, or that the number of indexed position on the left and right be equal. Moreover, the difference in position between any two consecutive indexed positions may be different from the difference between the position of two other consecutive indexed positions. In one embodiment, L4 may be separated from L3 by about 0.25 inches, L3 may be separated from L2 by about 0.25 inches, and L2 may be separated from L1 by about 0.25 inches. Thus, the interposition separation of L1, L2, L3, and L4 may be about 0.25 inches. In one embodiment, R4 may be separated from R3 by about 0.25 inches, R3 may be separated from R2 by about 0.25 inches, and R2 may be separated from R1 by about 0.25 inches. Thus, the interposition separation of R1, R2, R3, and R4 may be about 0.25 inches. Finally, in a preferred embodiment, the distance between L1 and R1 may be between approximately 2.0inches and approximately 7.0 inches. Using the described selective area deposition technique, multi-layer patterning of a fiber battery as shown in FIG. 8 may be as follows.

A first layer of 1.0 μm phosphor bronze anode current collecting film (210) may be deposited on a 150 μm diameter SiC fiber monofilament (200). Subsequently, the inner layer of the multi-layer electrolyte system may be constructed. This may include a second deposited layer of a 1.0 μm amorphous Lipon electrolyte film (220). Next, the middle layer of the multi-layer electrolyte system may deposited, including an interlayer (230) of 0.05 μm $Li_aP_bSn_cO_dN_e$ (0<a<100, 0<b<100, 0<c<a/2+5/2+2b−3d/2, and 0<d<a/3+5/3+4b/3−2c/3). This fracture stunting, lithium-ion conducting interlayer (230) may be followed by a fourth deposited layer of a 1.0 μm amorphous Lipon electrolyte film (240). The fifth deposited layer may include a layer of 1.5 μm of lithiated cathode material. In this example, the lithiated cathode material is $Li_xV_2O_y$ (0<x≦2; 0<y≦5) (250). A subsequent sixth deposited layer may include a layer of a 0.5 μm thick Cu cathode current collector (260). Finally, a seventh layer (270) may include a layer of a 0.5 μm Lipon encapsulating overlayer thin-film. An encapsulant layer is recommended for lithium-ion thin-film batteries.

Figure 9:
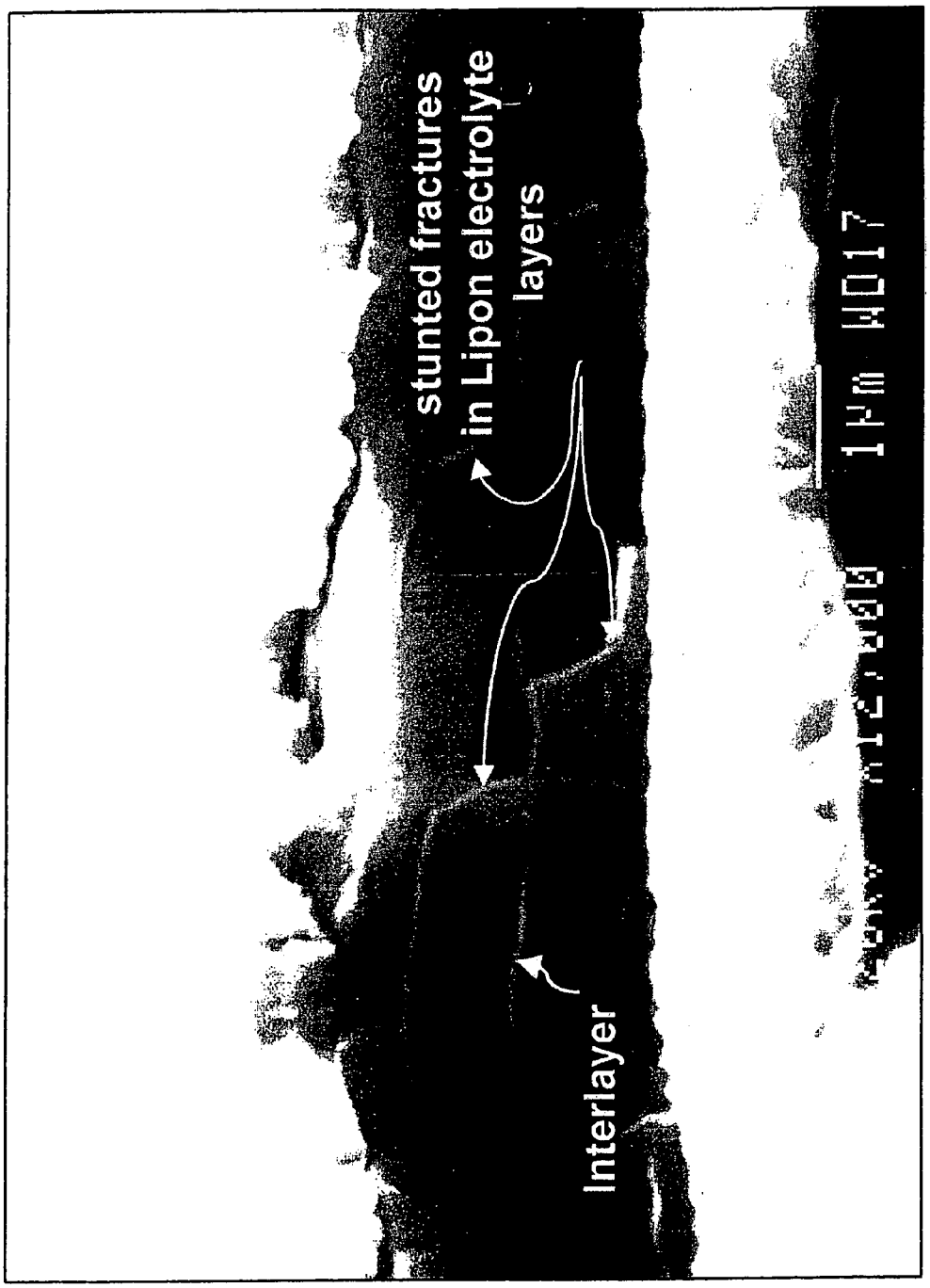
FIG. 9 is an SEM micrograph readout of a hand-fractured cross-section of an example inverted lithium-free configuration.

FIG. 9 shows an SEM micrograph of a hand-fractured cross-section of an inverted lithium-free configuration battery, with the configuration shown in FIG. 8. Evident in this diagram are the stunted fracture patterns of the two Lipon electrolyte films sandwiching the $Li_aP_bSn_cO_dN_e$ (0<a<100, 0<b<100, 0<c<a/2+5/2+2b−3d/2, and 0<d<a/3+5/3+4b/3−2c/3) fracture absorbing interlayer. The fracture patterns indicate that expansion and contraction stress fractures during battery cycling may be stunted within the multi-layer electrolyte system. But for the present invention, fractures of the type shown in FIG. 9 would have propagated through the bulk single-layer electrolyte causing battery leakage or failure. In contrast, eight fibrous batteries fabricated together, electrically in parallel, in a polymeric matrix, as described in more detail in U.S. Provisional Patent Application No. 60/318,319 (which is herein incorporated by reference in its entirety), achieved more than 2,300 full electrochemical cycles while showing a very high cycle stability represented by a capacity loss of less than 0.025% per cycle.

Figure 10:
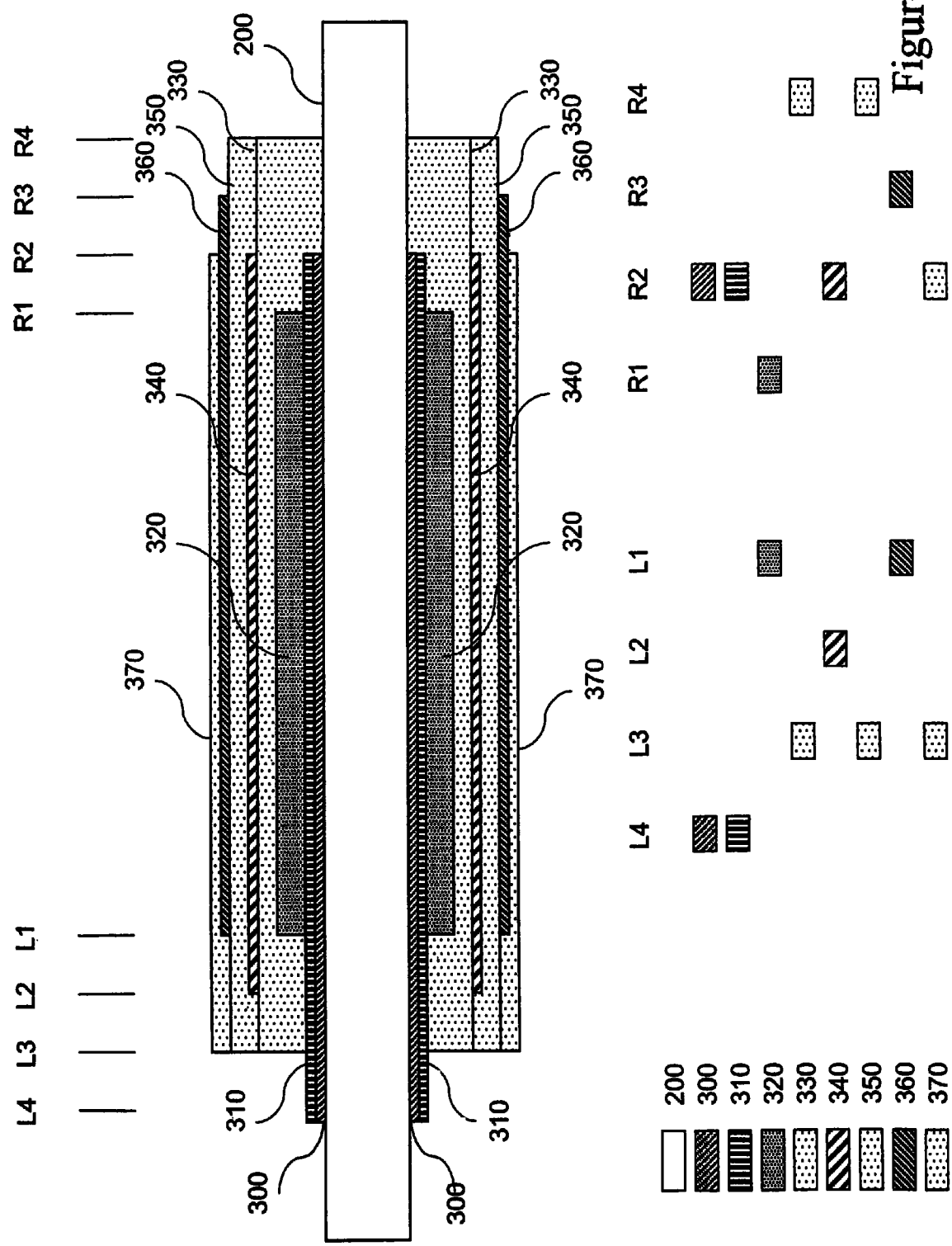
FIG. 10 is a side-view cutaway diagram illustrating a lithium-free battery configuration with a multi-layer electrolyte system for fracture absorption as produced, for example, on a fiber.

FIG. 10 shows a cutaway schematic of a lithium-free battery configuration with a multi-layer electrolyte system for fracture absorption, produced on a fiber. The patterning methodology for deposition of solid-state, thin-film secondary batteries on fibrous substrates is disclosed in pending U.S. patent application Ser. No. 10/109,991. The nomenclature L4-L1 and R1-R4 are specific to the descriptive text associated to this application, and as described above. Using the described selective area deposition technique, multi-layer patterning of the fiber battery as shown in FIG. 10 is as follows.

A first layer 0.05 μm Ni adhesion promoting and cathode current collecting film (300) may be deposited on a 150 μm diameter SiC fiber monofilament (200). A second layer of 0.5 μm Au cathode current collecting film (310) may then be deposited. The current collector may be annealed at 700° C. in air for 1 h. Subsequently, a lithiated cathode material including an amorphous 1.5 μm $LiCoO_2$ may be deposited (320). Next, the $LiCoO_2$ cathode may be crystallized in a post-deposition anneal at 700° C. in air for 1 h. Next, the multi-layer electrolyte system may be deposited. The inner layer of the multi-layer electrolyte system may include a layer of a 1.0 μm amorphous Lipon electrolyte film (330). The middle layer of the multi-layer electrolyte system may include a layer of a 0.05 μm $Li_aP_bSn_cO_dN_e$ (0<a<100, 0<b<100, 0<c<a/2+5/2+2b−3d/2, and 0<d<a/3+5/3+4b/3−2c/3) fracture stunting, lithium-ion conducting, interlayer (340). Next, the outer layer of the multi-layer electrolyte system may be deposited. The outer layer may include a layer of a 1.0 μm amorphous Lipon electrolyte film (350). Next, a 0.5 μm Cu anode current collector film (360) may be deposited. Finally, a 0.5 μm thick Lipon encapsulating thin-film layer (370) may be deposited.

Figure 11:
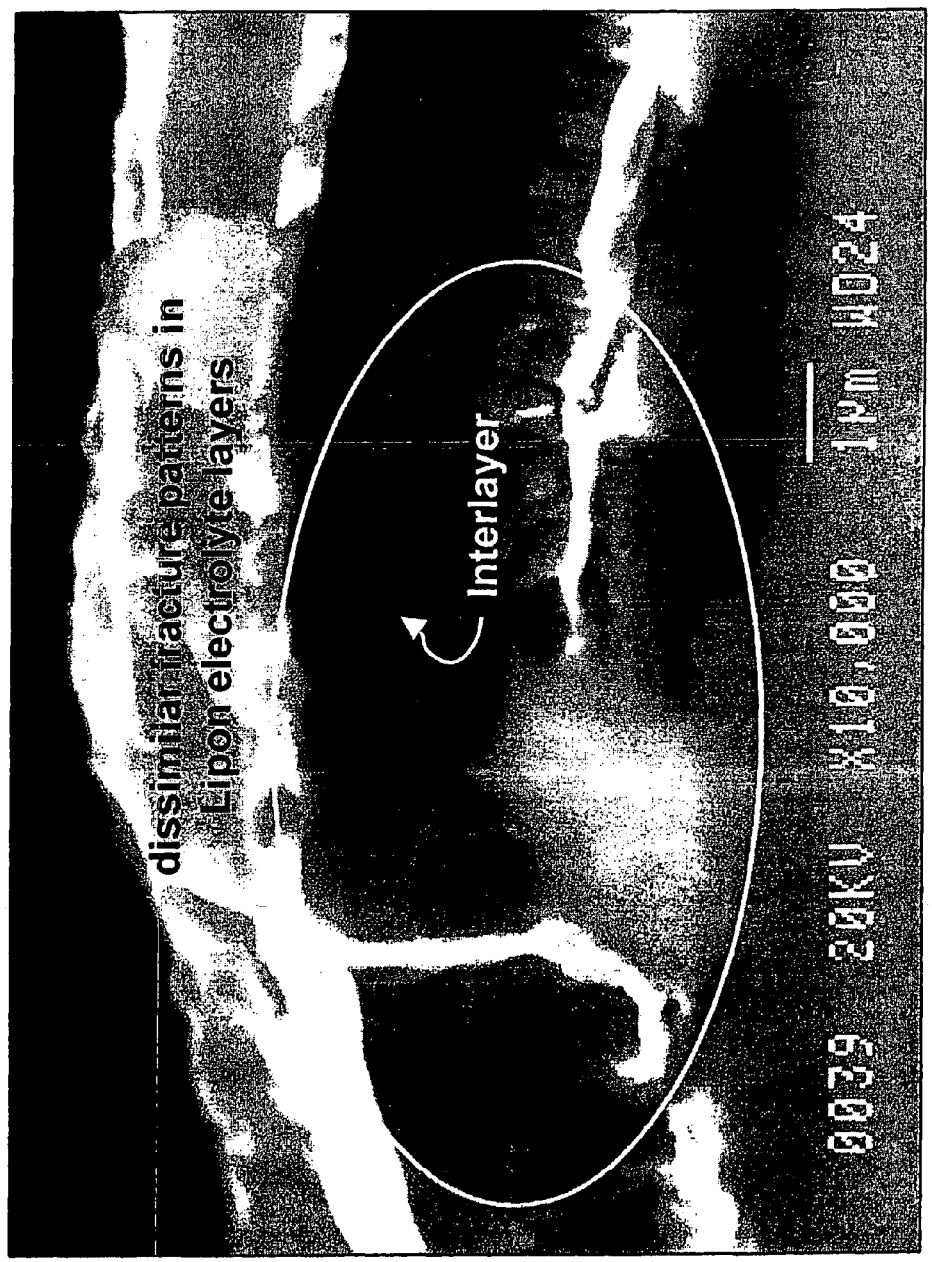
FIG. 11 is an SEM micrograph readout of a hand-fractured cross-section of an example lithium-free configuration.

FIG. 11 shows an SEM micrograph of a hand-fractured cross-section of a lithium-free configuration, with the configuration shown in FIG. 10, illustrating the dissimilar and stunted fracture patterns of the opposed Lipon electrolyte films. These films are interposed by the $Li_aP_bSn_cO_dN_e$ ($0<a<100$, $0<b<100$, $0<c<a/2+5/2+2b-3d/2$, and $0<d<a/3+5/3+4b/3-2c/3$) fracture absorbing interlayer. The cracked cross section of the upper Lipon layer is less rugged, exhibiting dissimilar fracture characteristics, compared to that of the lower Lipon layer. This is another indicator that expansion and contraction stress fractures during battery cycling may be stunted within the multi-layer electrolyte system. But for the present invention, fractures of the type shown in FIG. 11 would have propagated through the bulk single-layer electrolyte, causing battery leakage or failure.

The present invention of multi-layer electrolytes for fracture absorption may also improve survivability and reliability for solid-state, thin-film secondary batteries in a planar and flexible substrate format. To accomplish this object, ceramic components within the battery itself must be able to withstand the strains of flexible movements in lithium, lithium-free, and lithium-ion battery types. Flexing, wrapping, or twisting a flexible format thin-film battery involves a deformation of deposited ceramic materials within the battery including the electrode and electrolyte layers.

The fracture absorption capability of the present invention, through the technique of a multi-layer electrolyte, permits this flexibility. This is achieved by stunting the propagation of fractures that occur during deformation.

Figure 12:
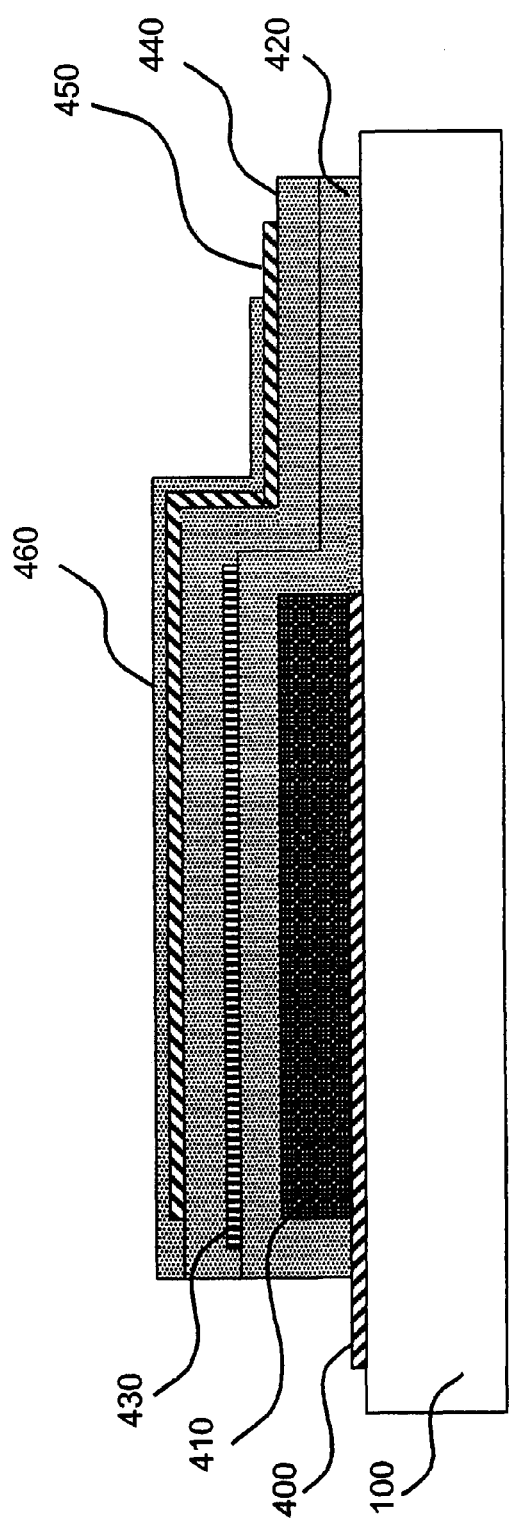
FIG. 12 is a side-view cutaway diagram illustrating a construction of an embodiment of a three layer electrolytic system for fracture stunting in a planar lithium-free flexible format battery configuration.

FIG. 12 illustrates the basic construction of a three layer electrolytic system for fracture stunting in a planar lithium-free flexible format battery configuration. Alternative planar battery configurations utilizing the present invention of the multi-layer electrolyte system will be apparent to one skilled in the art. Moreover, the multi-layer electrolyte is not limited to a single interlayer interposed between two amorphous electrolyte films as shown and further described below. Two or more interlayers may be interposed between three or more electrolyte films, and may provide additional fracture stunting capability.

A battery as shown, for example, in FIG. 12 maybe fabricated as follows. All depositions may be patterned through planar shadow masks with thin-film specific cutout patterns. Preliminarily, a thin, flexible substrate (100) may be provided. This flexible substrate may be a polymer film (for example, 1-500 µm thick; PET or polyimide), a metal foil (for example, 1-500 µm thick; stainless steel, titanium, or aluminum), or a thin ceramic plate (for example 10 µm thick Si, 80 µm thick $ZrO_2$, or 125 µm $Al_2O_3$). As a first layer, a metallic cathode current collector (ccc) may be deposited (400). The ccc may include a conductive material such as, for example, Cu, Ag, or Au. Next, a thin adhesion promoting metal or metal oxide layer of 0.03 µm of Co, Cr, or $Cr_2O_3$, for example, may be deposited if desired (not shown in this example). Next, a lithiated cathode of 0.05-20 µm thick (410) may be deposited. This layer may include, for example, $Li_2V_2O_5$, $Li_2Mn_2O_4$, or $LiCoO_2$. If desired, the cathode may be crystallized in a post-deposition anneal. Next, the multi-layer fracture absorbing electrolyte system may be fabricated. The inner layer (420) of the electrolyte system may include, for example, 1.0 µm amorphous Lipon. Next, the interlayer (430) may be deposited. This fracture stunting, ionically conducting interlayer (430) may include a layer of, for example, 0.05 µm $Li_aP_bSn_cO_dN_e$ ($0<a<100$, $0<b<100$, $0<c<a/2+5/2+2b-3d/2$, and $0<d<a/3+5/3+4b/3-2c/3$). Subsequently, the outer layer of the electrolyte (440) may be deposited. The outer layer of the electrolyte (440) may include a layer of, for example, 1.0 µm amorphous Lipon. The multi-layer fracture absorbing electrolyte system may also be deposited as two or more, for example, 0.05 µm $Li_aP_bSn_cO_dN_e$ ($0<a<100$, $0<b<100$, $0<c<a/2+5/2+2b-3d/2$, and $0<d<a/3+5/3+4b/3-2c/3$) layers (430) interposed between three or more, for example, 1.0 µm amorphous Lipon layers (420, 440). Next, a metallic anode current collector (450), for example, Cu, may be deposited. Finally, the battery may be encapsulated with a thin-film layer of, for example, a 1.0 µm amorphous Lipon (460).

Figure 13:
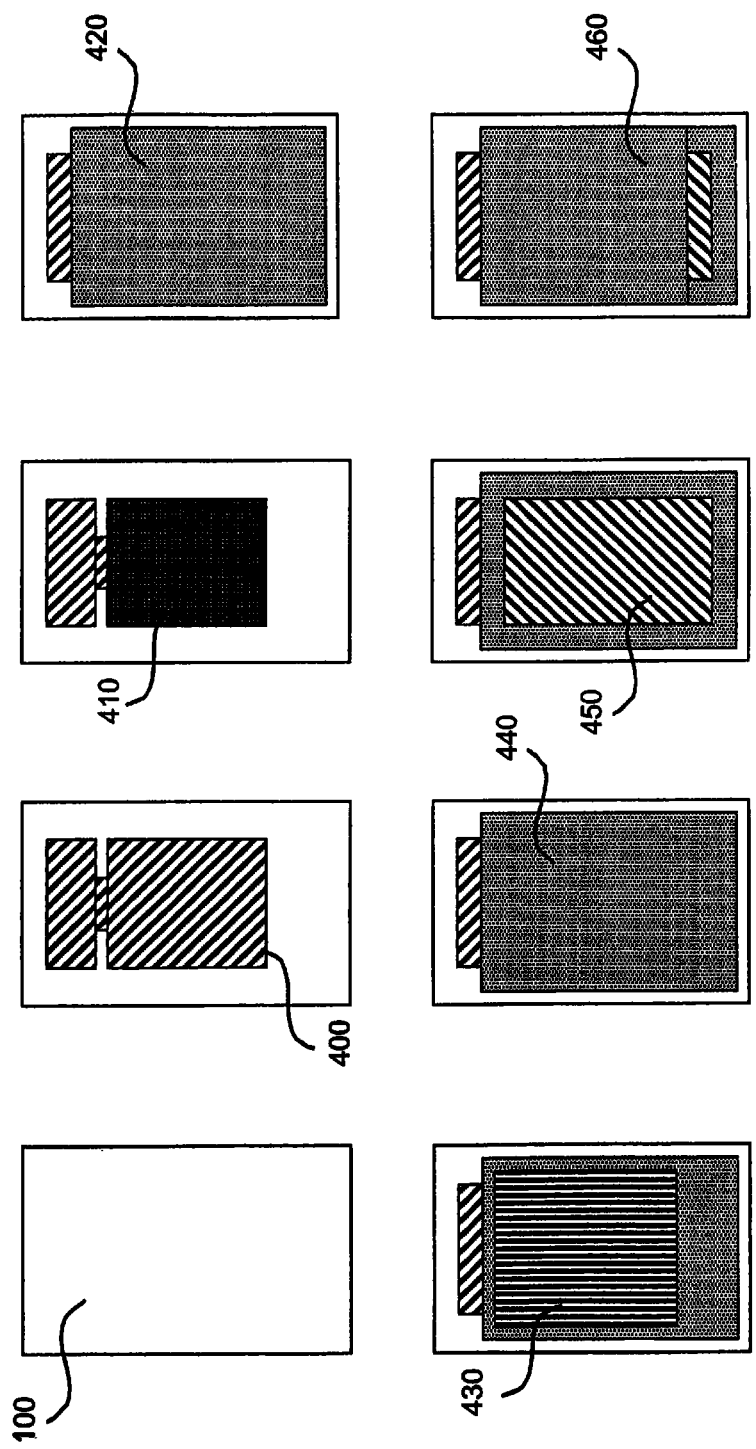
FIG. 13 is a deposition pattern schematic for an example planar configuration embodiment with multi-layer electrolyte.

FIG. 13 is an alternative view of the process described above for FIG. 12, showing the shadow mask patterning of this planar configuration. This view shows the substrate from above. The numbers used in this figure correspond to the same features described in FIG. 12.

Other embodiments of the invention will be apparent to those skilled in the art from consideration of the specification and the practice of the invention disclosed herein. It is intended that the specification and examples be considered as exemplary only, with a true scope and spirit of the invention being indicated by the following claims.

What is claimed is:

1. An apparatus for use as a fracture absorption layer, comprising:
   a first electrolyte layer formed of a first solid-state material and having a first side;
   a second electrolyte layer formed of a second solid-state material and having a first side opposing said first side of said first electrolyte layer; and
   a first interlayer formed of a third solid-state material and disposed between at least a portion of said first side of said first electrolyte layer, and at least a portion of said first side of said second electrolyte layer;
   wherein said third solid-state material is different from said first solid-state material and said second solid-state material;
   wherein said first interlayer structurally inhibits a fracture through said first electrolyte layer from spreading to said second electrolyte layer.

2. The apparatus of claim 1, wherein said first solid-state material comprises a material selected from the group consisting of a glassy thin-film electrolyte, $LiAlF_4$, Lipon, and a crystalline thin-film electrolyte.

3. The apparatus of claim 1, wherein said first electrolyte layer comprises a thickness of between approximately 0.05 to approximately 5 microns.

4. The apparatus of claim 1, wherein said first electrolyte layer comprises a thickness of between approximately 0.01 to approximately 2 microns.

5. The apparatus of claim 1, wherein said first electrolyte layer comprises a thickness of between approximately 0.5 to approximately 2 microns.

6. The apparatus of claim 1, wherein said first interlayer is connected to at least a portion of said first side of said first electrolyte layer by a technique selected from a group consisting of sputter deposition, physical vapor deposition, electron beam evaporation, electron-beam directed vapor deposition, thermal evaporation, plasma assisted thermal evaporation, ion plasma plating, cathodic arc plasma deposition, ion beam deposition, plasma assisted ion beam deposition, pulsed laser deposition, chemical vapor deposition, thermal chemical vapor deposition, plasma enhanced chemical vapor deposition, photo-chemical chemical vapor deposition, molecular beam epitaxy, sol-gel deposition, and spray pyrolysis deposition.

7. The apparatus of claim 1, wherein said third solid-state material comprises a material having the structural characteristic selected from a group consisting of glassy, amorphous, nano-crystalline, ceramic, metallic, and composite.

8. The apparatus of claim 1, wherein said first interlayer comprises a thickness of between about 0.005 microns and about 5 microns.

9. The apparatus of claim 1, wherein said first interlayer comprises a thickness of between about 0.01 microns and about 0.5 microns.

10. The apparatus of claim 1, wherein said first interlayer comprises a thickness of between about 0.05 microns and about 0.1 microns.

11. The apparatus of claim 1, wherein said third solid-state material comprises a material selected from a group consisting of the following:
an ionic conductor; an electric insulator; a mixed conductor;
elemental lithium; alloyed lithium; elemental phosphorus; alloyed phosphorous; elemental tin; alloyed tin;
a single phase compound of $Li_aPSn_bO_cN_d$ wherein $0<a<100$, $0<b<100$, $0<c<a/2+5/2+2b-3d/2$, and $0<d<a/3+5/3+4b/3-2c/3$;
a multi-phase compound of $Li_aPSn_bO_cN_d$ wherein $0<a<100$, $0<b<100$, $0<c<a/2+5/2+2b-3d/2$, and $0<d<a/3+5/3+4b/3-2c/3$;
a single phase compound of $Li_aPM_bO_cN_d$ wherein $0<a<100$, $0<b<100$, $0<c<a/2+5/2+b(\text{Valence of M})/2-3d/2$, $0<d<a/3+5/3+b(\text{Valence of M})/3-2c/3$, and M is an element selected from group 2 through 15 of the periodic table excluding the elements Li, P, and N;
a multi-phase compound of $Li_aPM_bO_cN_d$ wherein $0<a<100$, $0<b<100$, $0<c<a/2+5/2+b(\text{Valence of M})/2-3d/2$, $0<d<a/3+5/3+b(\text{Valence of M})/3-2c/3$, and M is an element selected from group 2 through 15 of the periodic table excluding the elements Li, P, and N;
elemental M wherein M is an element selected from group 2 through 15 of the periodic table excluding the elements Li, P, and N; alloyed M wherein M is an element selected from group 2 through 15 of the periodic table excluding the elements Li, P, and N;
a single phase compound of $Li_aPM_bO_cN_dX_e$ wherein $0<a<100$, $0<b<100$, $0<c<a/2+5/2+b(\text{Valence of M})/2-3d/2-e(\text{Valence of X})/2$, $0<d<a/3+5/3+b(\text{Valence of M})/3-2c/3-e/3(\text{Valence of X})$, $0<e<a/(\text{Valence of X})+5/(\text{Valence of X})+b(\text{Valence of M})/(\text{Valence of X})-2c/(\text{Valence of X})-3d/(\text{Valence of X})$, M is an element selected from group 2 through 15 of the periodic table excluding the elements Li, P, and N, and X is an element selected from S, Se, Te, F, Cl, Br, and I;
a multi-phase compound of $Li_aPM_bO_cN_dX_e$ wherein $0<a<100$, $0<b<100$, $0<c<a/2+5/2+b(\text{Valence of M})/2-3d/2-e(\text{Valence of X})/2$, $0<d<a/3+5/3+b(\text{Valence of M})/3-2c/3-e/3(\text{Valence of X})$, $0<e<a/(\text{Valence of X})+5/(\text{Valence of X})+b(\text{Valence of M})/(\text{Valence of X})-2c/(\text{Valence of X})-3d/(\text{Valence of X})$, M is an element selected from group 2 through 15 of the periodic table excluding the elements Li, P, and N, and X is an element selected from S, Se, Te, F, Cl, Br, and I;
$Li_3N$; $Li_2O$; LiF; LiCl; LiBr; LiI; $Li_2Be_2O_3$; $Li_4BeO_3$; Be; BeO; $LiBO_2$; B; $B_2O_3$; BN; $Li_5AlO_4$; $LiAlO_2$; $LiAl_5O_8$; Al; $Al_2O_3$; AlN; $Li_2CO_3$; $Li_4SiO_4$; $Li_8SiO_6$; Si; $SiO_2$; $Si_3N_4$; $Li_4GeO_4$; Ge; $GeO_2$; $Ge_3N_4$; $Li_3PO_4$; P; $P_2O_5$; $P_2O_5$; $P_5N_3PN$; PON; $P_4ON_6$; $Li_3AsO_4$; As; $As_2O_3$; $As_2O_5$; $Li_2SO_4$; S; $LiClO_4$; $LiScO_2$; Sc; $Sc_2O_3$; $LiYO_2$; Y; $Y_2O_3$; YN; $Li_8ZrO_6$; Zr; $ZrO_2$; ZrN; $LiCeO_2$; Ce; $CeO_2$; $LiAlSiO_4$; $Li_9SiAlO_8$; $Li_{3.6}Si_{0.6}P_{0.4}O_4$; $Li_3Sc_2(PO_4)_3$; $LiTi_2(PO_4)_3$; $Li_{0.2}BPO_{4.1}$; $Li_3BN_2$; $Li_3AlN_2$; $LiSi_2N_3$; $Li_2SiN_2$; $Li_5SiN_3$; $Li_{18}Si_3N_{10}$; $Li_{21}Si_3N_{11}$; $Li_8SiN_4$; $LiPN_2$; $Li_7PN_4$; $LiAlF_4$; $LiAlCl_4$; $LiPF_6$; $LiBF_4$; $Li_3SiS_{3.5}$;
$Li_xV_2O_y$ ($0<x\leq 2$; $0<y\leq 5$); $Li_xMn_2O_4$ ($0<x\leq 2$); $Li_xMn_{2-y}O_4$ ($0<x<3$; $0.2<y<0.5$); $Li_xMnO_2$ ($0<x\leq 2.0$); $Li_xCoO_2$ ($0<x\leq 1$); $Li_xNiO_2$ ($0<x\leq 2$); $Li_xSn_3N_y$ ($0<x<100$; $0<y\leq 4.0$); $Li_xInN_y$ ($0<x<100$; $0<y\leq 1.0$); $Li_xZn_3N_y$ ($0<x<100$; $0<y\leq 2.0$); $Li_xZnO_y$ ($0<x<100$; $0<y\leq 1.0$); $Li_xCuN_y$ ($0<x<100$; $0<y\leq 0.33$); $Li_xSiSn_{0.9}ON_{1.9}$ ("Siton"; $0<x<100$); $Li_xSnO_y$ ($0<x<100$; $0<y\leq 2.0$); $Li_xAl$ ($0<x<100$); $Li_xIn$ ($0<x<100$); $Li_xC_6$ ($0<x<100$); $Li_xSi$ ($0<x<100$); $Li_xSn$ ($0<x<100$); $Li_xP$ ($0<x<100$); and $Li_xZn$ ($0<x<100$).

12. The apparatus of claim 1, wherein said third solid-state material comprises a polymer matrix.

13. The apparatus of claim 12, wherein said polymer matrix comprises a material selected from a group consisting of polyethelyene oxide, polyimide, polytetrafluoroethylene, polyester, and polyvinylpyrrolidone.

14. The apparatus of claim 1, further comprising:
a second interlayer formed of a fourth solid-state material having a first side and a second side, and
a third electrolyte layer formed of a fifth solid-state material and having a first side;
wherein said second electrolyte layer further comprises a second side;
wherein at least a portion of said first side of said second interlayer is connected to at least a portion of said second side of said second electrolyte layer;
wherein at least a portion of said first side of said third electrolyte layer is connected to at least a portion of said second side of said second interlayer; and
wherein said fourth solid-state material is different from said second solid-state material and said fifth solid-state material;
wherein said second interlayer structurally inhibits a fracture through said second electrolyte layer from spreading to said third electrolyte layer.

15. An apparatus for use as an electrochemical device, comprising:
a first electrolyte layer formed of a first solid-state material and having a first side;
a second electrolyte layer formed of a second solid-state material and having a first side opposing said first side of said first electrolyte layer;
an interlayer formed of a third solid-state material and disposed between at least a portion of said first side of said first electrolyte layer, and at least a portion of said first side of said second electrolyte layer, wherein said third solid-state material is different from said first solid-state material and said second solid-state material, wherein said interlayer inhibits a fracture through said first electrolyte layer from spreading to said second electrolyte layer;
an anode layer;
a cathode layer, wherein said first electrolyte layer, said second electrolyte layer, and said interlayer are disposed between said anode layer and said cathode layer; and
a substrate layer for supporting said apparatus.

16. The apparatus of claim 15, wherein said substrate layer comprises a geometry selected from a group consisting of planar, fibrous, ribbon-like, and cylindrical.

17. The apparatus of claim 15, wherein said substrate layer comprises a thickness of between approximately 1 micron and approximately 6.35 millimeters.

18. The apparatus of claim 15, wherein said substrate layer comprises a thickness of between approximately 25 microns and approximately 127 microns.

19. The apparatus of claim 15, wherein said substrate layer comprises a material selected from a group consisting of ceramic, metal, metal-alloy, glass, silicon, semiconductor, shape memory alloy, carbon, and polymer.

20. The apparatus of claim 15, wherein said substrate layer comprises a cylindrical geometry and a diameter of between approximately 1 micron and approximately 6.35 millimeters.

21. The apparatus of claim 15, wherein said substrate layer comprises a cylindrical geometry and a diameter of between approximately 10 microns and approximately 381 microns.

22. The apparatus of claim 15, wherein said substrate layer comprises a flexible material.

23. The apparatus of claim 15, wherein said substrate layer comprises a conformable material.

24. The apparatus of claim 15, wherein said anode layer comprises an anode type selected from the group consisting of lithium-metal, lithium-free, and lithium-ion.

25. The apparatus of claim 15, further comprising one or more electrode layers.

26. The apparatus of claim 25, wherein one or more of said electrode layers comprises a thickness of between approximately 0.05 microns and approximately 10 centimeters.

27. The apparatus of claim 1, said first solid-state material being the same as said second solid-state material.

28. A solid-state lithium rechargeable battery, comprising:
an anode layer including lithium;
a first electrolyte layer formed on said anode layer, said first electrolyte layer formed of a first solid-state material;
an interlayer formed on said first electrolyte layer, said interlayer being formed of a second solid-state material;
a second electrolyte layer formed on said interlayer, said second electrolyte layer formed of a third solid-state material;
a cathode layer formed on said second electrolyte layer; and
a cathode current collector layer formed on said cathode layer;
wherein said second solid-state material is different from said first solid-state material and said third solid-state material;
wherein said interlayer structurally inhibits a fracture through said first electrolyte layer from spreading to said second electrolyte layer.

29. The battery of claim 28, each of said first and second solid-state materials comprising Lipon.

* * * * *